US012383893B2

(12) United States Patent
Wegner et al.

(10) Patent No.: US 12,383,893 B2

(45) **Date of Patent: *Aug. 12, 2025**

(54) METHOD AND SYSTEM FOR BUOYANT SEPARATION

(71) Applicant: Akadeum Life Sciences, Inc., Ann Arbor, MI (US)

(72) Inventors: Casey Wegner, Ann Arbor, MI (US); William Lloyd, Ann Arbor, MI (US); Brandon H. McNaughton, Ann Arbor, MI (US); Brittany MacIntyre, Ann Arbor, MI (US)

(73) Assignee: Akadeum Life Sciences, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,581

(22) Filed: Oct. 10, 2023

(65) Prior Publication Data

US 2024/0066520 A1 Feb. 29, 2024

Related U.S. Application Data

(63) Continuation of application No. 17/896,800, filed on Aug. 26, 2022, now Pat. No. 11,819,842.

(Continued)

(51) Int. Cl.

*B01L 3/00* (2006.01)
*B04B 5/04* (2006.01)

(52) U.S. Cl.

CPC ........ *B01L 3/50215* (2013.01); *B04B 5/0414* (2013.01); *B01L 2200/0689* (2013.01);

(Continued)

(58) Field of Classification Search

None

See application file for complete search history.

(56) References Cited

U.S. PATENT DOCUMENTS

| | | | |
|---|---|---|---|
| 3,381,283 | A | 4/1968 | Gyorgy et al. |
| 3,586,064 | A | 6/1971 | Brown et al. |

(Continued)

FOREIGN PATENT DOCUMENTS

| | | |
|---|---|---|
| DE | 3381283 | 4/1990 |
| EP | 0778944 B1 | 11/1999 |

(Continued)

OTHER PUBLICATIONS

Corrosionpedia—Diaphragm Pump—Published: Oct. 2, 2014 Updated: May 4, 2019 (Year: 2019).

(Continued)

*Primary Examiner* — Lore R Jarrett

(74) *Attorney, Agent, or Firm* — Jeffrey Schox; Annabel Imbrie-Moore

(57) ABSTRACT

A system for buoyant separation includes a separation container. Additionally or alternatively, the system can include an automated instrument, one or more processing components, and/or any other components. A method for buoyant separation can include any or all of: manipulating the separation container; adding materials to the separation container; removing materials form the separation container; otherwise processing the separation container; and/or any other processes.

20 Claims, 22 Drawing Sheets
(5 of 22 Drawing Sheet(s) Filed in Color)

Related U.S. Application Data

(60) Provisional application No. 63/346,202, filed on May 26, 2022, provisional application No. 63/237,498, filed on Aug. 26, 2021.

(52) U.S. Cl.
CPC . *B01L 2300/042* (2013.01); *B01L 2300/0681* (2013.01); *B01L 2400/0633* (2013.01)

(56) References Cited

U.S. PATENT DOCUMENTS

| | | | |
|---|---|---|---|
| 3,692,493 | A | 9/1972 | Terasaki |
| 3,920,549 | A | 11/1975 | Gigliello et al. |
| 4,086,060 | A | 4/1978 | Hermann |
| 4,464,254 | A | 8/1984 | Dojki et al. |
| 4,487,700 | A | 12/1984 | Kanter |
| 4,689,151 | A | 8/1987 | Kosikowski et al. |
| 4,714,680 | A | 12/1987 | Civin |
| 4,845,025 | A | 7/1989 | Lary et al. |
| 5,116,724 | A | 5/1992 | Delaage et al. |
| 5,182,192 | A | 1/1993 | Steplewski et al. |
| 5,246,829 | A | 9/1993 | Delaage et al. |
| 5,266,199 | A | 11/1993 | Tsukagoshi et al. |
| 5,339,830 | A | 8/1994 | Blake |
| 5,354,483 | A | 10/1994 | Furse |
| 5,594,164 | A | 1/1997 | Bull |
| 5,639,382 | A | 6/1997 | Brown |
| 5,674,173 | A | 10/1997 | Hlavinka et al. |
| 5,730,864 | A | 3/1998 | Delsalle et al. |
| 5,853,600 | A | 12/1998 | McNeal et al. |
| 5,874,266 | A | 2/1999 | Palsson |
| 6,036,940 | A | 3/2000 | Ju et al. |
| 6,151,113 | A | 11/2000 | Odonohue et al. |
| 6,221,315 | B1 | 4/2001 | Giesler et al. |
| 6,261,537 | B1 | 7/2001 | Klaveness et al. |
| 6,264,917 | B1 | 7/2001 | Klaveness et al. |
| 6,331,289 | B1 | 12/2001 | Klaveness et al. |
| 6,416,739 | B1 | 7/2002 | Rogerson et al. |
| 6,506,167 | B1 | 1/2003 | Ishimoto et al. |
| 6,528,039 | B2 | 3/2003 | Unger |
| 6,544,424 | B1 | 4/2003 | Shevitz |
| 6,569,340 | B2 | 5/2003 | Kopf |
| 6,652,136 | B2 | 11/2003 | Marziali |
| 6,723,303 | B1 | 4/2004 | Quay |
| 6,919,031 | B2 | 7/2005 | Blumenschein et al. |
| 7,524,641 | B2 | 4/2009 | Jurgensen et al. |
| 7,704,393 | B2 | 4/2010 | Noh et al. |
| 7,736,593 | B2 | 6/2010 | Dastane et al. |
| 7,771,590 | B2 | 8/2010 | Leach et al. |
| 7,915,540 | B2 | 3/2011 | Oggioni |
| 7,947,236 | B2 | 5/2011 | Losada et al. |
| 7,981,286 | B2 | 7/2011 | Higuchi et al. |
| 8,048,320 | B2 | 11/2011 | Leach et al. |
| 8,066,127 | B2 | 11/2011 | Coelho et al. |
| 8,177,072 | B2 | 5/2012 | Chapman et al. |
| 8,183,039 | B2 | 5/2012 | Schmitz et al. |
| 8,290,714 | B2 | 10/2012 | Ignatius et al. |
| 8,513,032 | B2 | 8/2013 | Jablonski et al. |
| 8,540,082 | B2 * | 9/2013 | Kelland .............. B01L 3/50215 210/515 |
| 8,617,884 | B2 | 12/2013 | Berenson et al. |
| 8,747,289 | B2 | 6/2014 | Coelho |
| 8,834,698 | B2 | 9/2014 | Lau et al. |
| 8,835,186 | B2 | 9/2014 | Jablonski et al. |
| 9,011,819 | B2 | 4/2015 | Rychak |
| 9,039,999 | B2 | 5/2015 | Campton et al. |
| 9,114,334 | B2 | 8/2015 | Leach et al. |
| 9,119,508 | B2 | 9/2015 | Reed |
| 9,120,095 | B2 | 9/2015 | Oconnell |
| 9,234,890 | B2 | 1/2016 | Adams et al. |
| 9,410,182 | B2 | 8/2016 | Wu |
| 9,410,183 | B2 | 8/2016 | Wu |
| 9,435,799 | B2 | 9/2016 | Russell et al. |
| 9,506,930 | B2 | 11/2016 | Ignatius et al. |
| 9,528,088 | B2 | 12/2016 | Berenson et al. |
| 9,551,706 | B2 | 1/2017 | Phillips et al. |
| 9,599,545 | B2 | 3/2017 | Coelho |
| 9,695,394 | B1 | 7/2017 | Coelho et al. |
| 9,766,237 | B2 | 9/2017 | Jablonski et al. |
| 9,790,467 | B2 | 10/2017 | Kevlahan et al. |
| 9,797,817 | B2 | 10/2017 | McNaughton et al. |
| 9,821,111 | B2 | 11/2017 | Coelho et al. |
| 9,841,360 | B1 * | 12/2017 | Solazzi ..................... B01L 3/50 |
| 9,857,361 | B2 | 1/2018 | Wanders et al. |
| 10,052,427 | B2 | 8/2018 | Flieg et al. |
| 10,132,309 | B2 | 11/2018 | Manzarek et al. |
| 10,195,280 | B2 | 2/2019 | De Mollerat Du Jeu et al. |
| 10,195,547 | B2 | 2/2019 | McNaughton et al. |
| 10,273,504 | B2 | 4/2019 | Miltenyi et al. |
| 10,302,536 | B2 * | 5/2019 | Shi ........................... B03D 1/14 |
| 10,407,486 | B2 | 9/2019 | Schmitz et al. |
| 10,479,976 | B2 | 11/2019 | Shi et al. |
| 10,585,088 | B2 | 3/2020 | Gohel et al. |
| 10,640,275 | B2 | 5/2020 | McGrath et al. |
| 10,640,276 | B2 | 5/2020 | McGrath et al. |
| 10,684,172 | B2 | 6/2020 | Carron et al. |
| 10,739,338 | B2 | 8/2020 | Kevlahan et al. |
| 10,752,689 | B2 | 8/2020 | Aggeler et al. |
| 10,792,362 | B2 | 10/2020 | De Mollerat Du Jeu et al. |
| 10,794,900 | B2 | 10/2020 | Wanders et al. |
| 10,859,477 | B2 | 12/2020 | Nakamura et al. |
| 10,890,586 | B2 | 1/2021 | Wu et al. |
| 10,934,519 | B2 | 3/2021 | Roy et al. |
| 11,007,285 | B2 | 5/2021 | Butts et al. |
| 11,046,738 | B2 | 6/2021 | Person et al. |
| 11,105,796 | B2 | 8/2021 | Fuerstenberg et al. |
| 11,141,435 | B2 | 10/2021 | Coelho et al. |
| 11,155,714 | B2 | 10/2021 | Xu et al. |
| 11,247,178 | B2 | 2/2022 | Smyslova et al. |
| 11,291,931 | B2 | 4/2022 | McNaughton et al. |
| 11,339,407 | B2 | 5/2022 | Waters et al. |
| 11,524,985 | B2 | 12/2022 | Kalabokis et al. |
| 11,565,237 | B2 | 1/2023 | Kevlahan et al. |
| 11,819,842 | B2 | 11/2023 | Wegner et al. |
| 2002/0048819 | A1 | 4/2002 | Alley |
| 2003/0066850 | A1 | 4/2003 | Young |
| 2003/0104359 | A1 | 6/2003 | Cuthbertson et al. |
| 2004/0023222 | A1 | 2/2004 | Russell et al. |
| 2004/0166029 | A1 | 8/2004 | Losada et al. |
| 2005/0059163 | A1 | 3/2005 | Dastane et al. |
| 2006/0054191 | A1 | 3/2006 | Higuchi et al. |
| 2006/0131236 | A1 | 6/2006 | Belfort et al. |
| 2006/0283896 | A1 * | 12/2006 | Kasting .................. B65D 51/20 222/549 |
| 2007/0015191 | A1 | 1/2007 | Bitner et al. |
| 2007/0036722 | A1 | 2/2007 | Rongved et al. |
| 2007/0075016 | A1 | 4/2007 | Leach |
| 2007/0190584 | A1 | 8/2007 | Jurgensen et al. |
| 2008/0034509 | A1 | 2/2008 | Nuennerich et al. |
| 2009/0042284 | A1 | 2/2009 | Tachibana et al. |
| 2010/0285606 | A1 | 11/2010 | Phillips et al. |
| 2011/0097816 | A1 | 4/2011 | Goodwin |
| 2011/0236884 | A1 | 9/2011 | Jablonski et al. |
| 2012/0202225 | A1 | 8/2012 | Knutson et al. |
| 2013/0029411 | A1 | 1/2013 | Roy et al. |
| 2013/0280767 | A1 | 10/2013 | Kobayashi et al. |
| 2014/0161688 | A1 | 6/2014 | Campton et al. |
| 2014/0277672 | A1 | 9/2014 | Manzarek et al. |
| 2015/0011013 | A1 * | 1/2015 | Campton ............. B01D 21/262 422/533 |
| 2015/0021963 | A1 | 1/2015 | Reed |
| 2015/0080204 | A1 * | 3/2015 | Kassis ................. A61M 1/3693 494/37 |
| 2015/0219636 | A1 | 8/2015 | Rychak et al. |
| 2015/0260178 | A1 | 9/2015 | Giessbach |
| 2015/0320924 | A1 | 11/2015 | Flieg et al. |
| 2016/0167061 | A1 | 6/2016 | McNaughton et al. |
| 2017/0001191 | A1 | 1/2017 | Biadillah et al. |
| 2017/0014819 | A1 | 1/2017 | U'Ren et al. |
| 2017/0059552 | A1 | 3/2017 | Campton et al. |
| 2017/0183619 | A1 | 6/2017 | Coelho et al. |
| 2018/0171295 | A1 | 6/2018 | Shi et al. |
| 2018/0290077 | A1 | 10/2018 | McNaughton et al. |

(56) References Cited

U.S. PATENT DOCUMENTS

| | | | |
|---|---|---|---|
| 2020/0009614 | A1 | 1/2020 | McNaughton et al. |
| 2020/0072834 | A1 | 3/2020 | Busa et al. |
| 2020/0276540 | A1 | 9/2020 | Smyslova et al. |
| 2021/0180108 | A1 | 6/2021 | Kim et al. |
| 2023/0314428 | A1 | 10/2023 | Snow et al. |

FOREIGN PATENT DOCUMENTS

| | | | |
|---|---|---|---|
| EP | 1073716 | B1 | 4/2004 |
| EP | 2104488 | B1 | 10/2016 |
| GB | 1407267 | A | 9/1975 |
| JP | 2001120964 | A | 5/2001 |
| JP | 2014521333 | A | 8/2014 |
| WO | 2011052927 | A2 | 5/2011 |
| WO | 2012090863 | A1 | 7/2012 |
| WO | 2013096157 | A1 | 6/2013 |
| WO | 2015133972 | A1 | 9/2015 |
| WO | 2017109072 | A1 | 6/2017 |
| WO | 2017190117 | A1 | 11/2017 |

OTHER PUBLICATIONS https://en.wikipedia.org/wiki/Diaphragm_pump (Year: 2021).

https://www.yamadapump.com/what-is-a-double-diaphragm-pump/#:-:text=A (Year: 2021).

Mud Sucker Diaphragm Pumps, https://wastecorp.com/ms-faqs (Year: 2021).

Moon, Sang Ho , "Bio-device for extracting hematopoietic stem cells and mesenchymal stem cells in peripheral blood", Translation of WO 2011/052927 A2, 2011, WIPO, p. 1-23 (Year: 2011).

Wang, Meiyao , "Quantifying CD4 receptor protein in two human CD4+ lymphocyte preparations for quantitative flow cytometry", Clinical proteomics, 11 (1 ), 43. https:// doi.org/10.1186/1559-0275-11-43.

Lloyd, William , et al., "Method and System for Partially or Fully Automated Buoyancy-assisted Separation", U.S. Appl. No. 18/441,894, filed Feb. 14, 2024.

* cited by examiner

200

Vent closed

Vent open

Drain closed

Drain open

METHOD AND SYSTEM FOR BUOYANT SEPARATION

CROSS-REFERENCE TO RELATED APPLICATIONS

This application is a continuation of U.S. application Ser. No. 17/896,800, filed 26 Aug. 2022, which claims the benefit of U.S. Provisional Application No. 63/237,498, filed 26 Aug. 2021, and U.S. Provisional Application No. 63/346,202, filed 26 May 2022, each of which is incorporated in its entirety by this reference.

TECHNICAL FIELD

This invention relates generally to the biological sample separation field, and more specifically to a new and useful system and method for buoyant separation in the biological sample separation field.

BACKGROUND

The ability to isolate one or more types of particles in the sample is a critical process in numerous industries and applications, such as healthcare applications, biological research, research in the food industry, and medical research, among others. Conventional techniques for particle isolation are typically derived from one or more of: fluorescence activated sorting, magnetic sorting, filtration, electrophoretic separation, and other methods of separation. These conventional particle isolation systems, however, are typically inefficient, have low-throughput, are labor intensive, are prone to user-error or failure, which limit their usefulness and adoption.

Thus, there is a need in the biological sample processing field to create an improved method and system for efficient and accurate separation of target components of a sample.

BRIEF DESCRIPTION OF THE FIGURES

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
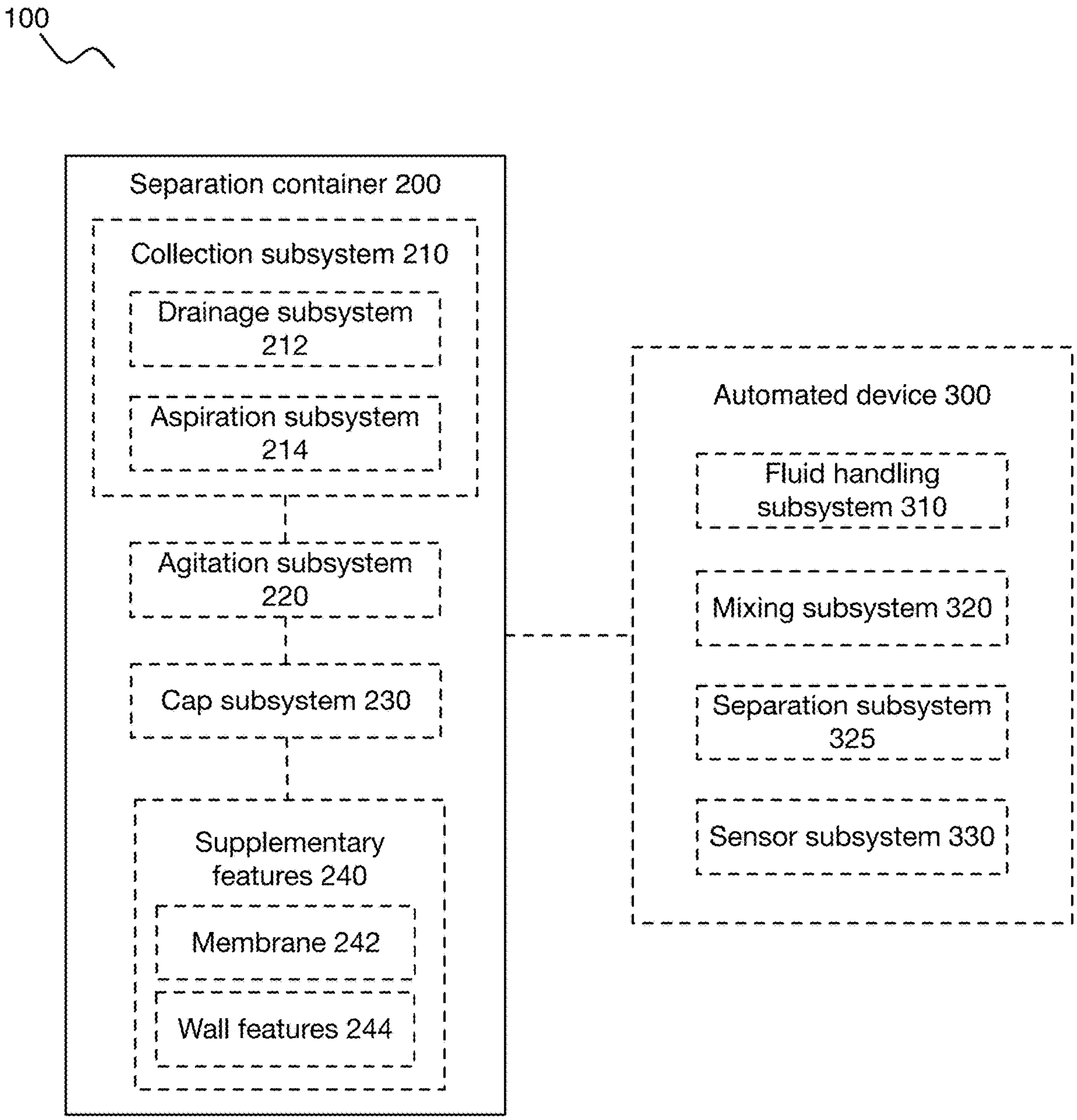
FIG. 1 is a schematic of a system for buoyant separation.

As shown in FIG. 1, a system 100 for buoyant separation includes a separation container. Additionally or alternatively, the system can include one or more processing components and/or any other components. Further additionally or alternatively, the system 100 can include and/or interface with any or all of the components as described in U.S. application Ser. No. 14/969,446, filed 15 Dec. 2015, U.S. application Ser. No. 16/004,874, filed 11 Jun. 2018, and U.S. application Ser. No. 16/506,865, filed 9 Jul. 2019, each of which is incorporated herein in its entirety by this reference.

Figure 2:
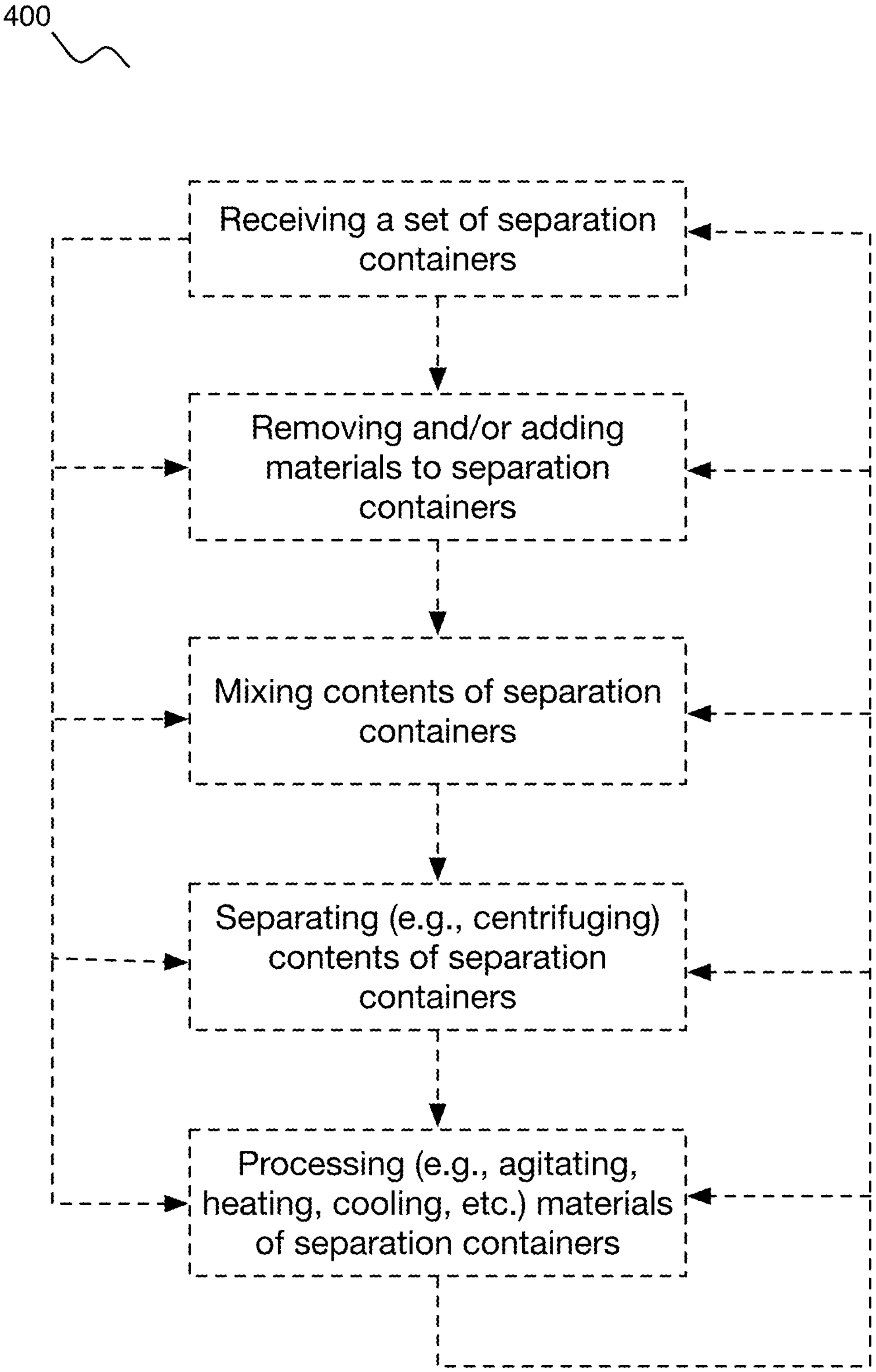
FIG. 2 is a schematic of a method for buoyant separation.

As shown in FIG. 2, a method 400 for buoyant separation can optionally include any or all of: manipulating the separation container; adding materials to the separation container; removing materials form the separation container; otherwise processing the separation container; and/or any other processes. Additionally or alternatively, the method 400 can include and/or interface with any or all of the processes as described in U.S. application Ser. No. 14/969,446, filed 15 Dec. 2015, U.S. application Ser. No. 16/004,874, filed 11 Jun. 2018, and U.S. application Ser. No. 16/506,865, filed 9 Jul. 2019, each of which is incorporated herein in its entirety by this reference, and/or any other suitable processes performed in any suitable order. The method 400 can be performed with a system 100 as described above and/or any other suitable system.

2. Benefits

The system and method for buoyant separation can confer several benefits over current systems and methods.

In a first set of variations, the technology confers the benefit of enabling the capture of a high percentage (e.g., large majority, greater than 70%, greater than 80%, greater than 90%, greater than 92%, greater than 94%, greater than 95%, greater than 96%, greater than 98%, 100%, etc.) of target particles with a set of buoyant particles. In specific examples, for instance, a separation container is used which is configured to provide an optimal flow rate along with an agitation mechanism for maximizing collection of a cell pellet (e.g., while minimizing collection of non-pellet materials in the separation container) and/or cells proximal to (e.g., immediately above) a pellet, thereby enabling a greater percentage of target particles to be collected with the system and/or method described below as compared with other systems and/or methods.

In a second set of variations, additional or alternative to the first, the technology confers the benefit of enabling high throughput separation. In specific examples, the separation is performed in a partially or fully automated fashion, which can be performed on higher volumes than manual conventional separation processes. In alternative specific examples, any or all of the separation process can be performed manually.

In a third set of variations, additional or alternative to those described above, the technology confers the benefit of enabling both positive and negative selection capabilities with the same system and/or method. In specific examples, this is further enabled with no or minimal disruption of the buoyant particle layer produced during separation.

In a fourth set of variations, additional or alternative to those described above, the technology confers the benefit of capturing and separating numerous types of analyte targets, such as, but not limited to, any or all of: cells, proteins, nucleic acids, various components in blood, other biological materials, chemicals, magnetic materials, other particles, and/or any other targets.

Additionally or alternatively, the system and method can confer any other benefits.

3. System 100

As shown in FIG. 1, a system 100 for buoyant separation includes a separation container. Additionally or alternatively, the system can include one or more processing components and/or any other components. Further additionally or alternatively, the system 100 can include and/or interface with any or all of the components as described in U.S. application Ser. No. 14/969,446, filed 15 Dec. 2015, U.S. application Ser. No. 16/004,874, filed 11 Jun. 2018, and U.S. application Ser. No. 16/506,865, filed 9 Jul. 2019, each of which is incorporated herein in its entirety by this reference.

The system 100 functions to enable the separation of target material (e.g., target analytes) from non-target material (e.g., solution, buffers, etc.). The system 100 can additionally or alternatively function to enable efficient separation, high throughput (e.g., high volume, fast, etc.) separation, automated or partially automated separation, accurate separation (e.g., with minimal or no non-target material captured during the separation, with maximal or all target material captured during the separation, etc.), and/or any other separation.

The target material to be isolated and/or extracted can include any suitable materials, biological or non-biological, such as, but not limited to, any or all of: cells (e.g., red blood cells, white blood cells, T-cells, circulating tumor cells, stem cells [e.g., CD34+ cells], CD45RA+ naive T cells [not expressed on memory T cells], TCRα/β+ T cells, B Cells [e.g., CD19 cells], etc.), proteins, nucleic acids, lipids, other particles commonly found in biological fluid, and/or any other materials. Additionally or alternatively, the target material can include multiple materials and/or any other materials.

The system 100 preferably interfaces with (e.g., holds, contains, etc.) a set of buoyant particles (equivalently referred to herein as bubbles, microbubbles, beads, spheres, floating particles, etc.), wherein the buoyant particles are configured to bind to the target material (e.g., during positive selection) or the non-target material (e.g., during negative selection), and thereby enable the bound particles to separate through buoyancy from the non-target material.

The buoyant particles can include any one or more of: plastic beads (e.g., polypropylene beads, polyethylene beads, etc.), glass beads, lipid beads (e.g., stabilized liposome-based beads), hollow beads, solid beads, liquid-filled beads, and any other suitable type of particle.

The buoyant particles are preferably characterized by a first density lower than that of the density (i.e., a second density) of fluid of the sample (e.g., ranging from 0.1 $g/cm^3$ and 0.99 $g/cm^3$). As such, substrates of the volume of substrates are preferably configured to float within the sample (e.g., at a top surface of fluid) to facilitate separation of target material (equivalently referred to herein as target constituents) from non-target material. However, substrates of the volume of substrates can alternatively be configured with any other suitable density relative to that of the density of fluid and/or untargeted constituents of the sample to facilitate separation.

In examples, the buoyant particles have a diameter from 10 nm to 100 nm in targeting analytes or 1 μm to 30 μm in targeting cells; however, the particles can have any other suitable dimension configured facilitate efficient binding with elements of the target constituent.

In one variation, the volume of buoyant particles comprises silica beads having a density less than that of fluid of the sample, wherein the silica beads are treated with a moiety (e.g., Streptavidin for biotin binding, an antibody for formation of an antibody-antigen complex, another moiety, etc.) configured to selectively couple with associated portions of the target constituent (e.g., cell, analyte) of the sample. In a second variation, the volume of substrates comprises microbubbles (e.g., gas-filled microparticles, hollow microspheres, colloidal bubbles) that can be spheroidal, skirted, ellipsoidal or any other suitable three-dimensional shape. The shape of the microbubbles can vary dynamically in response to the fluid dynamics of the sample volume (e.g., changing from one shape to another dictated by gravity, viscosity, and surface tension), but can alternatively be a fixed shape. In a specific example, the microbubbles are comprised of borosilicate glass that can include a particle shell surrounding a particle core (e.g., gas filled, fluid-filled, particle-filled, etc.). However, the particle shell can be alternatively composed of any other suitable material including lipids, proteins, surfactants, polymers, and/or any suitable combination thereof. In this example, the glass microbubbles can be fabricated with a fixed spheroidal shape defining a particle diameter (e.g., ranging from between 5 to 30 micron), and a particle shell thickness (e.g., less than 2 micron thick). In solution, the volume of microbubbles to volume target constituent (e.g., target cell) ratio preferably ranges between 1:2 to 5:1. However, the substrates can be of any other suitable composition, shape, density, and/or dimension.

Furthermore, the substrates can be configured with moieties for binding to the target constituent (e.g., red blood cells, white blood cells, T-cells, circulating tumor cells, stem cells, etc.) and can additionally or alternatively include any one or more of: charge-based moieties, nucleic acid-targeting moieties, protein-based moieties (e.g., cell adhesion molecules, growth factors, synthetic proteins), and any other suitable moiety. In a specific example, the particle shell of the glass microbubbles can be coated with an aminosilane layer to allow for subsequent surface functionalization with biomolecules (e.g., antibodies, aptamers, lectins, oligos, etc.). After glass microbubbles have been amino-functionalized, the glass microbubbles are preferably crosslinked to streptavidin. However, any other suitable chemical procedure can be performed for surface functionalization of the substrates (e.g., PEGylation, click chemistry, layer-by-layer assembly, ink-jet printing etc.) for selective capture of target constituents, using any other suitable moiety.

Additionally or alternatively, the buoyant particles can include any or all of those described in U.S. application Ser. No. 14/969,446, filed 15 Dec. 2015, U.S. application Ser. No. 16/004,874, filed 11 Jun. 2018, and U.S. application Ser. No. 16/506,865, filed 9 Jul. 2019, each of which is incorporated herein in its entirety by this reference.

Additionally or alternatively, the system 100 can be otherwise configured to perform any other suitable functions.

3.1 System—Separation Container 200

The system 100 preferably includes a separation container 200, which functions to hold and facilitate the separation (e.g., efficient separation, complete separation, high-throughput separation, etc.) of target material from non-target material. Additionally or alternatively, the separation container can function to enable the processing of target materials, the processing of non-target materials, the addition of materials (e.g., prior to the separation process, during the separation process, after the separation process, etc.), the removal and/or collection of materials (e.g., prior to the separation process, during the separation process, after the separation process, etc.), the manipulation of materials, the treating of materials (e.g., with heat), and/or can function to enable any other processes.

Figure 7:
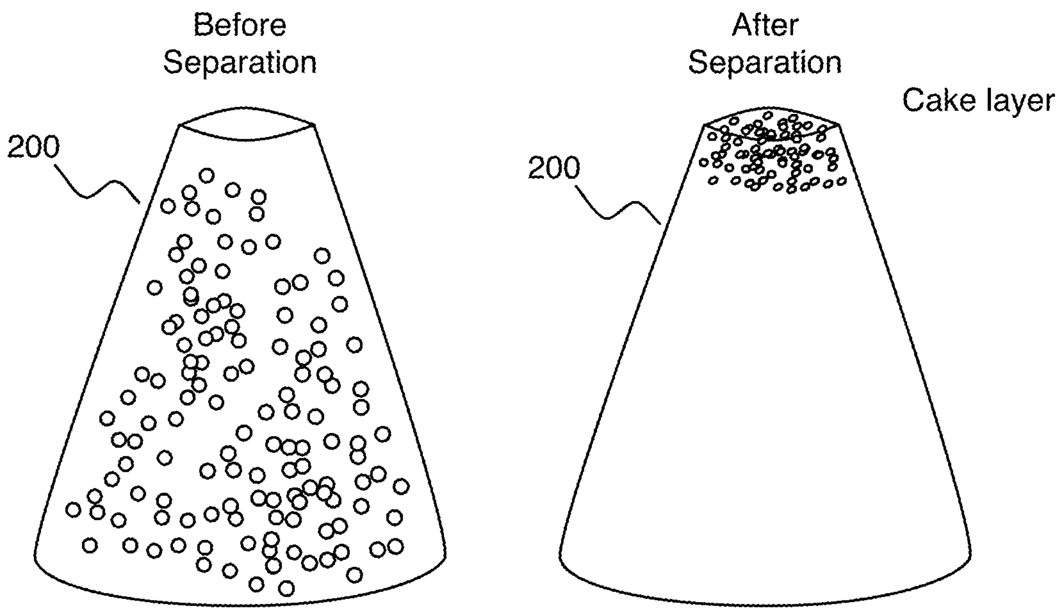
FIG. 7 depicts a schematic of a microbubble layer formed by buoyant particles as a result of buoyant separation.

In preferred variations, the separation container further functions to minimize disruption to a microbubble layer (equivalently referred to herein as a cake layer) formed by the buoyant particles at a superior surface of materials in the separation container (e.g., topmost layer, at and/or above and/or below a meniscus layer of fluid in the separation container, etc.) after (and/or during) separation (e.g., as shown in FIG. 7), such as after centrifugation and/or mixing processes (and/or absent of centrifugation and/or mixing processes). Conventionally, buoyant particles are difficult to collect due to this microbubble layer and disruption of it (e.g., with a pipette tip during collection of buoyant particles, during a vacuum aspiration of the microbubbles during a negative selection process which removes the buoyant particles leaves the unbound target material behind, with a pipette tip to remove the subnatant and isolate the positively selected cell fraction which are bound to the buoyant particles, etc.), which can lead to buoyant particles being left behind (e.g., reducing yield) and/or significant volumes of unwanted materials being collected with the buoyant particles (e.g., in order to collect all buoyant particles). In preferred variations, the separation container and/or any or all of its associated components enable materials to be collected from the separation container (e.g., after separation) without disrupting the microbubble layer. In a set of specific examples, for instance, a formed pellet is collected from an inferior region of the separation container (e.g., with a valve mechanism at the bottom of the separation container), which enables the pellet to be collected without disrupting a microbubble layer of buoyant particles floating at a superior surface of the separation container contents.

Additionally or alternatively, the separation container can be otherwise configured.

The separation container preferably defines a cavity (equivalently referred to herein as a chamber), wherein the cavity functions to receive the set of buoyant particles, target material, and non-target material (e.g., solutions, buffers, etc.). Additionally or alternatively: the cavity can function to receive any other materials and/or one or more components of the separation container (e.g., as described below); the separation container can define multiple cavities (e.g., permanently, in response to separation being completed, etc.); and/or the separation container can define any other suitable cavities.

The cavity is preferably defined by one or more walls of the separation container, which can be curved (e.g., into a circular cross section), straight, tapered (e.g., into a decreasing diameter as you travel in toward an inferior region of the separation container; as shown in the tapered inferior region of FIGS. 3A-3B, 4A-4C, 5, 6A, 13A-13C, 14, etc.) and/or define any other cross section. The interior surfaces of the wall(s) can optionally be configured (e.g., with a coating, with a textured surface, etc.) for any or all of: decreased adhesion between materials (e.g., target materials, materials which aggregate in a pellet after centrifugation, buoyant particles, etc.) and the interior surfaces (e.g., such that the cell pellet can be effectively and efficiently drained from a valve, such that buoyant particles can produce a more defined microbubble layer, etc.); increased adhesion between materials in the separation container (e.g., buoyant particles, reagents, target materials for re-suspension, etc.) and the interior surfaces (e.g., such that the buoyant particles can be collected from the walls, such that the remaining material can be collected without disrupting buoyant particles adhered to the walls, such that target materials can remain after draining materials from the separation container, such that target materials remain after draining non-target materials and therefore resuspended, etc.); and/or otherwise configured. Additionally or alternatively, the interior surfaces can be unaltered.

3.2 System—Collection Subsystem 210

The separation container preferably includes a collection subsystem 210, the collection subsystem including one or more collection components, which function to enable the collection of materials (e.g., target materials, non-target materials, etc.) from the cavity. The collection components can be any or all of: arranged within the cavity, coupled to (e.g., adhered to, defined by, etc.) a cap (e.g., as described below), coupled to an interior wall of the separation container, coupled to an exterior wall of the separation container, arranged outside of (e.g., remote from) the separation container, removably couplable with respect to the separation container, and/or can be otherwise arranged.

Figure 3A:
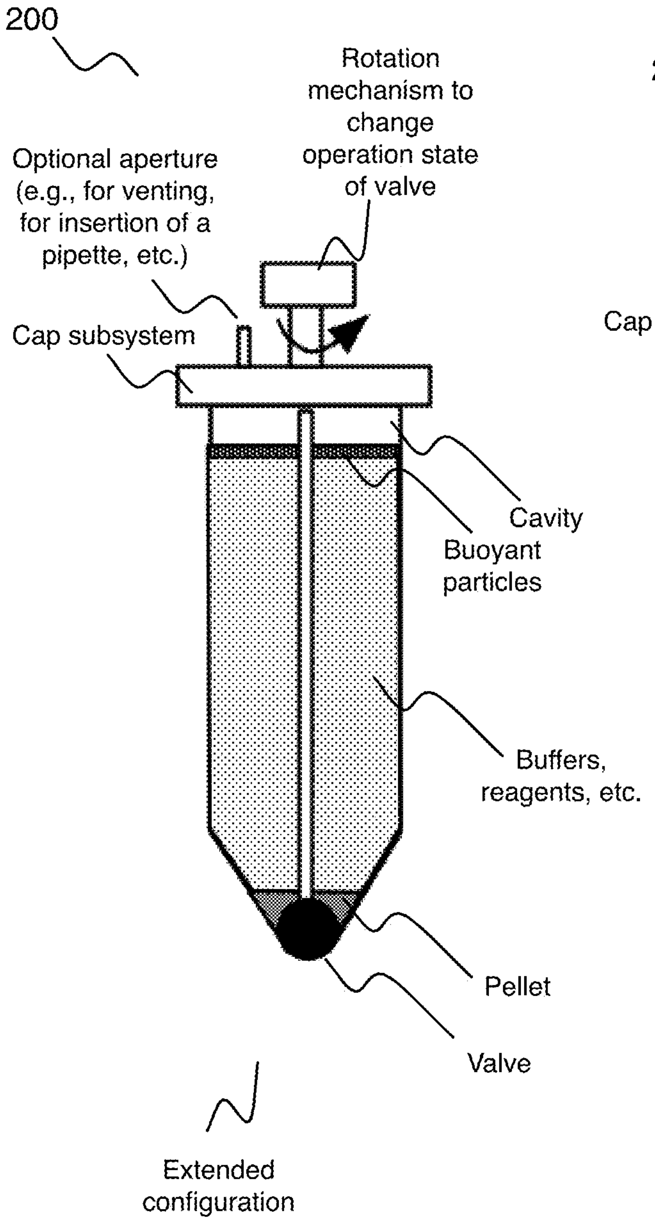
FIGS. 3A-3B depict a variation of a system for buoyant separation implementing a drainage mechanism.
Figure 3B:
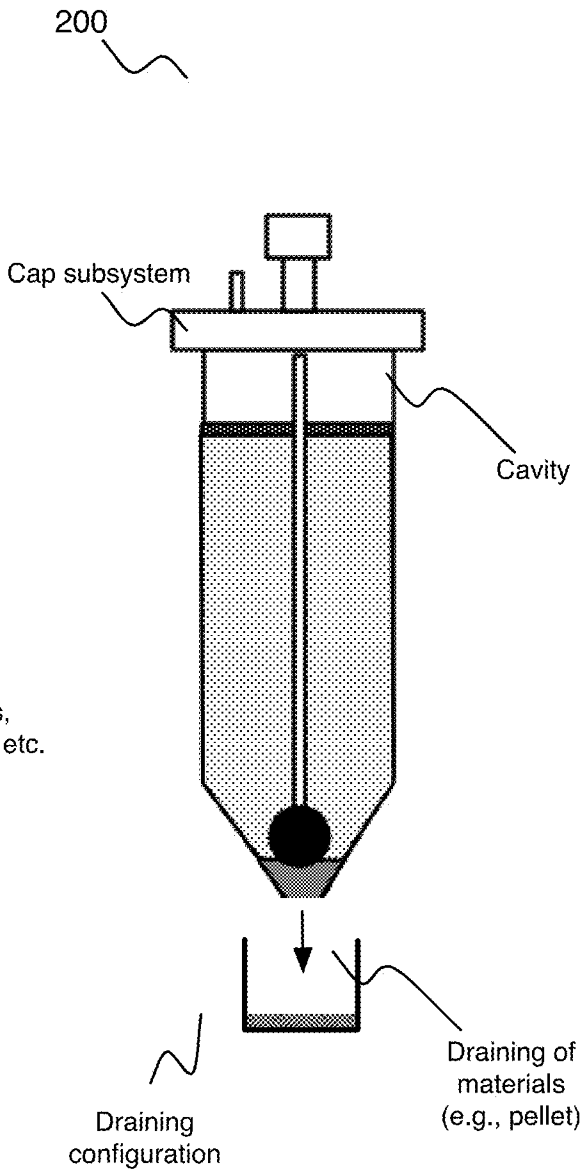
Figures 4A, 4B, 4C:
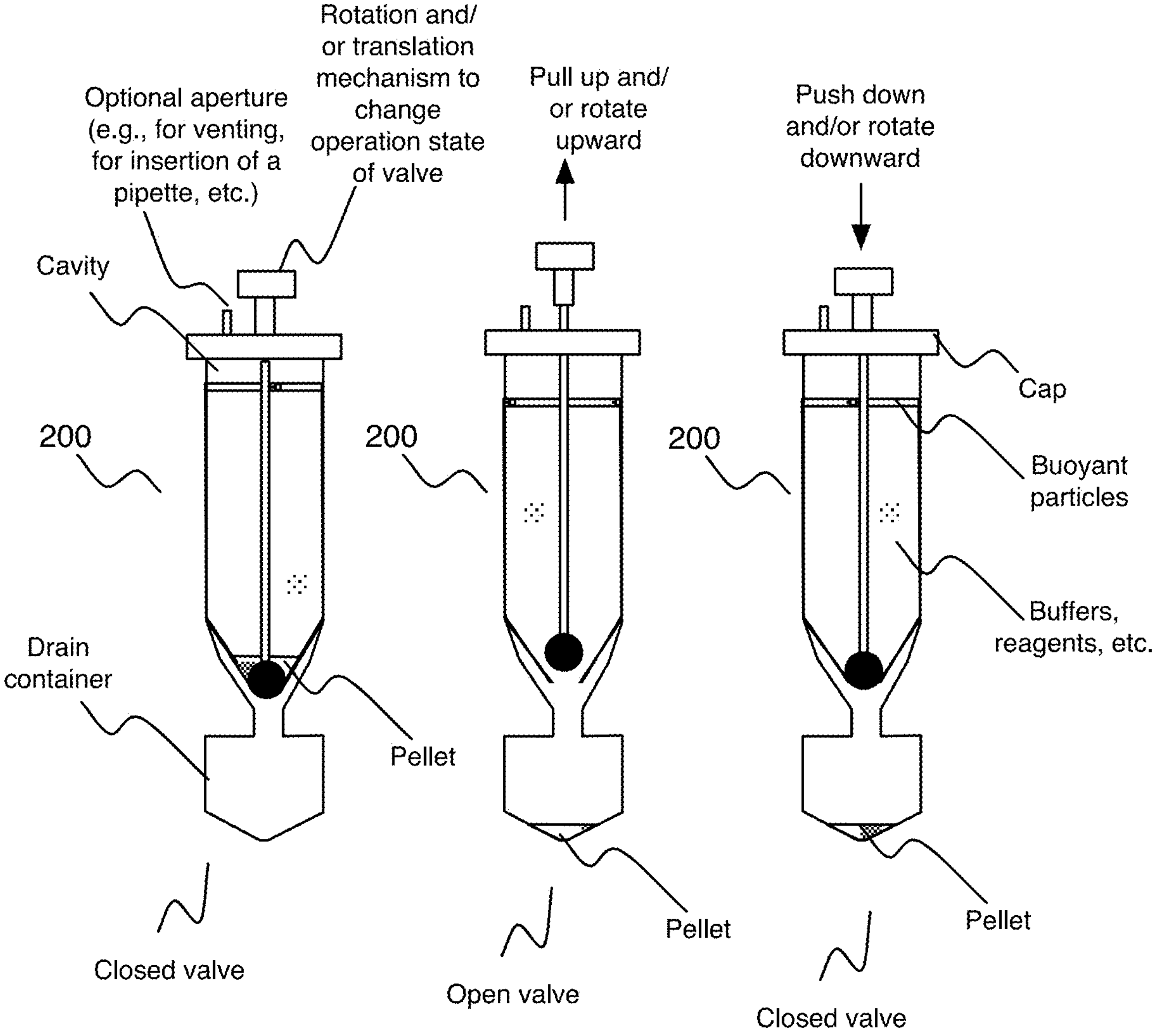
FIGS. 4A-4C depict a variation of a system for buoyant separation implementing a drainage mechanism.

The collection component (equivalently referred to herein as a removal component) preferably includes a drainage subsystem 212 (equivalently referred to herein as a drainage mechanism and/or drain and/or drain subsystem), wherein the drainage subsystem enables materials to be removed from (e.g., and collected, and sent to a waste chamber, etc.) the separation container. The drainage subsystem preferably includes one or more drainage holes defined by the separation container, where the materials are preferably drained through the one or more drainage holes. The drainage holes are preferably located at and/or defined at an inferior region of the separation container (e.g., a most inferior surface, a narrowest part of a conical region of the separation container, etc.) (e.g., as shown in FIGS. 3A-3B, as shown in FIGS. 4A-4C, etc.), but materials can additionally or alternatively be drained from a superior region, from any wall of the separation container, from a cap subsystem of the separation container (e.g., upon inverting the separation container), and/or from any other regions and/or components of the separation container.

The drainage hole can have any suitable cross-sectional shape (e.g., circular, ovular, rectangular, square, triangular, organic, etc.) and/or size, such as those which are configured to optimize a flow rate and/or collection of target materials during a drainage process (e.g., as described below). In a set of variations (e.g., for a 50 mL separation container, for a separation container between 20 mL and 80 mL, for a separation container less than 50 mL [e.g., 40 mL, 30 mL, 20 mL, 10 mL, between 0 mL and 50 mL, etc.], for a separation container greater than 50 mL [e.g., 60 mL, 70 mL, 80 mL, 100 mL, greater than 100 mL, etc.], etc.), the diameter of the drainage hole is large enough to enable a minimum flow rate and optionally small enough to ensure that the drain stop can make a proper seal with the separation container, and the values of the diameter are preferably between 1 and 10 millimeters (mm) (e.g., 5 mm, between 1-7 mm, between 4-6 mm, between 2-7 mm, between 4-8 mm, etc.). Additionally or alternatively, the drainage hole can have a diameter smaller than 1 mm (e.g., in variations with multiple drainage holes, in variations with small [e.g., micro] separation containers), a diameter greater than 10 mm (e.g., between 10 and 20 mm, between 15 and 30 mm, greater than 30 mm, etc.), and/or any other diameter.

The drainage subsystem 212 preferably includes a valve (equivalently referred to herein as a drain stop) which controls (e.g., permits, stops, limits, etc.) the drainage of materials from the separation container (e.g., through the drainage hole and/or holes). The valve can be operable in any or all of: a binary on/off drainage state, a variable drainage state (e.g., wherein the flow rate of materials is variable, wherein the size of materials being drained is variable, etc.), a combination of states, and/or any other states.

The valve can include any suitable valve type(s), such as, but limited to, any or all of: a ball valve, a duck bill valve, a butterfly valve, a check valve, a gate valve, a globe valve, a needle valve, a pinch valve, and/or any valve, and/or any combination of valves.

In some variations, the drain stop has material properties (e.g., stiffness, compliance, flexibility, geometry, size, etc.) configured for one or more advantages while using the separation container. These advantages, for instance, can include any or all of: establishing a tight (e.g., leakproof) seal when in a closed configuration (e.g., during centrifugation of the separation container contents); maximizing an amount of materials that are desired for drainage to be removed through the drainage hole; enabling material contents (e.g., pellet, fluid, etc.) of the separation container to flow optimally (e.g., freely, rapidly, with minimal turbulence, etc.) out of a drainage hole when in an open configuration (e.g., based on the drain stop having a smooth [e.g., minimal friction, Teflon, etc.] surface and/or surface coating and/or surface treatment, based on a geometry of the drain stop, etc.); enabling the drainage hole to transition quickly between states (e.g., open versus closed, along a spectrum of different "open" states each associated with different flow rates, etc.); and/or any other advantages and/or combination of advantages.

The drain stop can be made from any suitable materials, such as, but not limited to: elastomers (e.g., rubber, natural rubber, synthetic rubber [ethylene propylene diene terpolymer rubber, neoprene, etc.], nitrile rubber [e.g., Buna-N, etc.], butadiene rubber, styrene-butadiene rubber, ethylene-propylene monomer, etc.), polymers (e.g., silicone, fluoropolymers [e.g., Polytetrafluoroethylene, Teflon, etc.], etc.), any combination of materials, and/or any other materials.

In some variations, for instance, the drain stop is made from one or more materials (e.g., rubber, elastomer, polymer, etc.) having a compliance value and/or values configured to prevent flow (e.g., leakage) of materials (e.g., fluids) through the drainage hole when the drain stop is in a closed configuration (e.g., during centrifugation step(s) of the separation container, during mixing steps of the separation container, etc.). In a set of specific examples, for instance, this is enabled using a drain stop which is rigid (e.g., stiff, hard, etc.) enough to prevent fluids from translating and/or deforming the drain stop enough to leak through the drainage hole, while being compliant (e.g., flexible, soft, malleable, etc.) enough to establish a tight seal with the separation container such that the drainage hole is not accessible for passage of materials and/or to prevent the drain stop and/or an associated agitation subsystem from breaking or shearing during rotation (e.g., wiping of separation container walls and/or interior surface of separation container by fins). In a set of examples, for instance, the drain stop has a Shore A hardness, such as a hardness between 50 A and 90 A (e.g., between 55 A and 85 A, between 60 A and 80 A, between 65 A and 75 A, etc.). Additionally or alternatively, the drain stop can have a hardness greater than 90 A (e.g., between 90 A and 10 A, having a Shore D hardness greater than 40 D), a hardness less than 50 A (e.g., between 0 A and 50 A, Shore OO hardness of less than 50, etc.), a combination of hardness values, and/or any other material properties.

The drain stop can define and/or form any suitable shape and/or combination of shapes, such as a shape which is configured for any or all of the advantages described above, configured for other advantages, otherwise configured, and/or the drain stop can be otherwise suitably configured. In preferred set of variations, for instance, the drain stop is configured with a shape which has a large enough diameter to prevent leakage through the drainage hole (e.g., a major diameter, an inferior diameter, etc.) along with a profile (e.g., sloped sides with increasing diameter from a superior region to an inferior region) which encourages (e.g., optimizes for, maximizes, etc.) materials to flow through the drainage hole (e.g., with an optimized and/or maximal and/or particular flow rate(s), without blockages, etc.). Additionally or alternatively, a shape of the drain stop can be configured for any or all of: preventing certain materials from exiting the separation container (e.g., filter and/or size and/or arrangement to prevent buoyant particles from draining), encouraging formation of a pellet and/or pellet with certain properties (e.g., uniform distribution, closest proximity to drain hole, etc.), and/or any other suitable use cases.

Figures 13A, 13B, 13C:
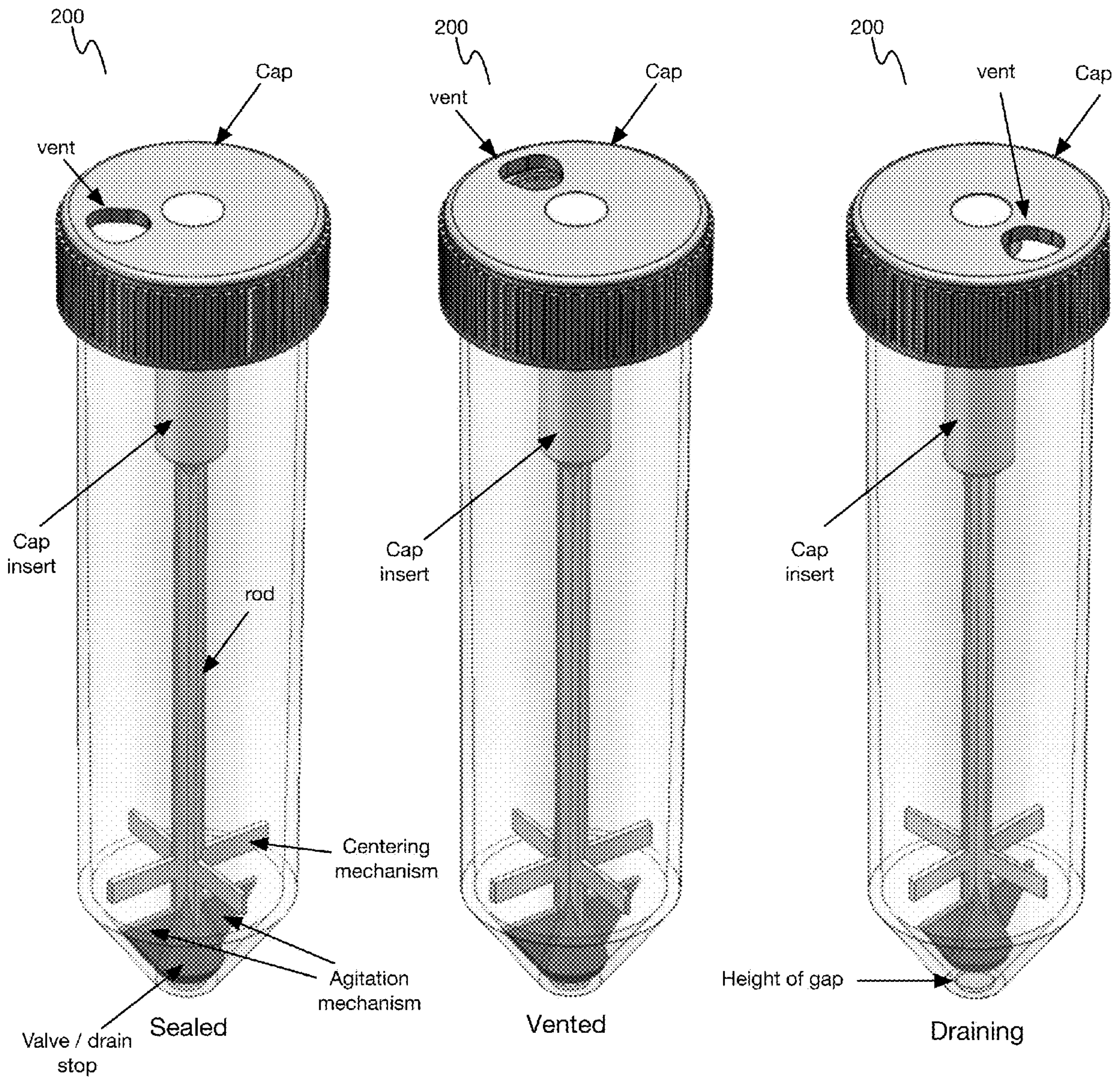
FIGS. 13A-13C depict a variation of a system for buoyant separation.
Figure 15A:
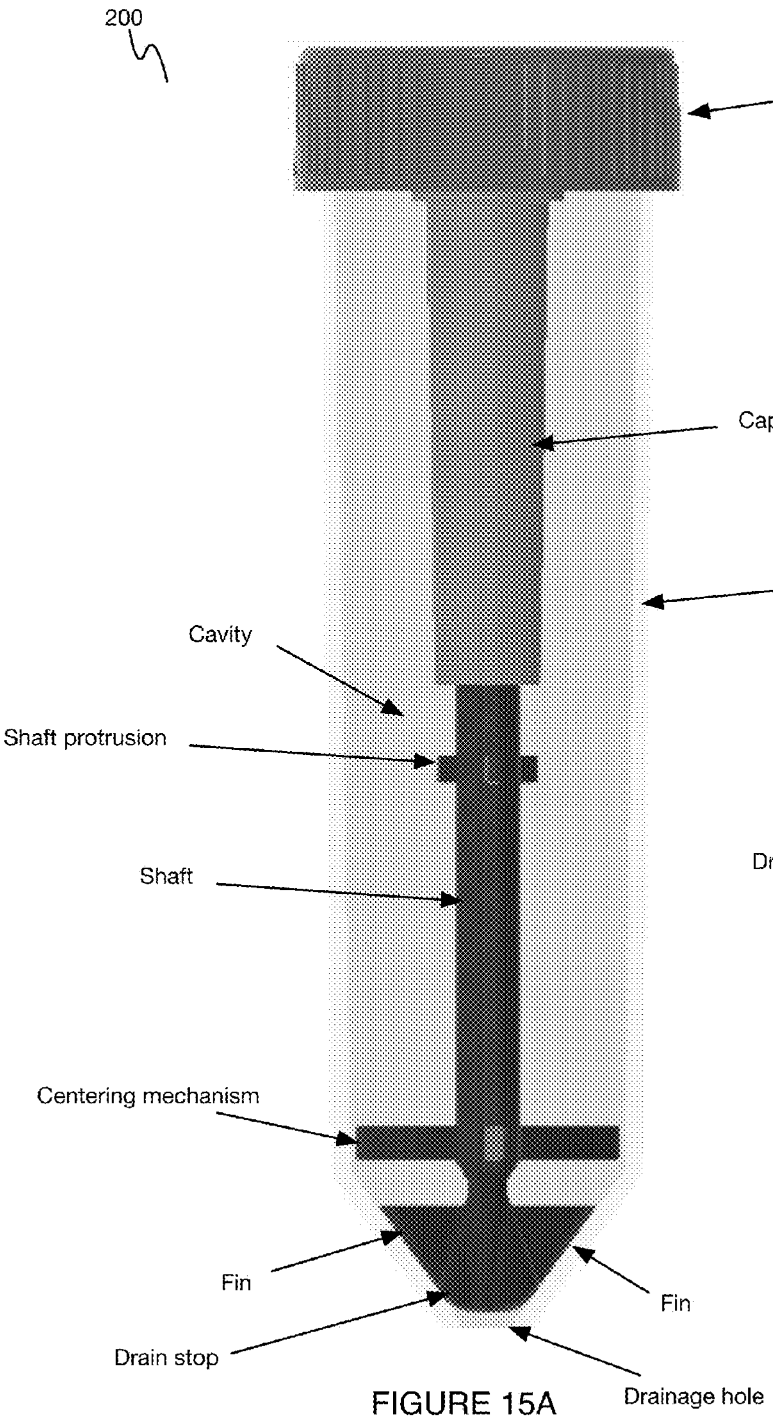
FIGS. 15A-15B depict a variation of a system for buoyant separation.
Figure 15B:
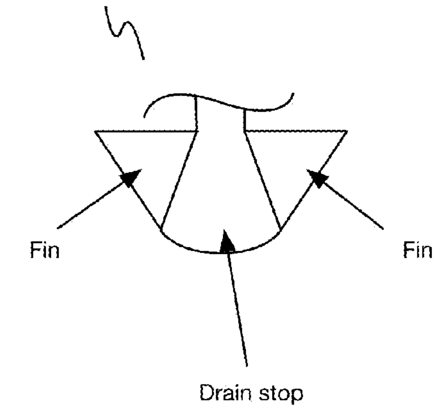

In a first set of variations, the drain stop defines a substantially conical and/or substantially frustoconical shape (e.g., as shown in FIGS. 13A-13C, as shown in FIGS. 15A-15B, frustoconical with a curved bottom, etc.), which defines a relatively large inferior diameter to prevent leakage through the drainage hole while the drain stop is in the closed configuration, along with sloped sides (e.g., downward sloping sides, sides which define an increasing diameter along a superior-to-inferior direction, etc.) which maximize the flow rate of materials which are able to pass by the drain stop in an "open" configuration and exit through the drainage hole. Additionally or alternatively, this shape can confer any other advantages.

In a second set of variations, the drain stop defines a spherical shape, which can confer any or all of the above advantages, different advantages, and/or any combination of advantages.

Additionally or alternatively, the drain stop can have any other shapes and/or profiles, such as, but not limited to: inverted conical and/or substantially inverted conical, inverted frustoconical and/or substantially inverted frustoconical, cylindrical, pyramidal, ovular, cubic, organic, and/or any other shapes and/or combination of shapes.

The drainage subsystem 212 can optionally include and/or interface with a rod mechanism (e.g., rod, shaft, beam, connector, tube, pole, etc.), wherein the change in operation state of the valve can be performed, for instance, with a rod mechanism attached to the valve, wherein movement of the rod (e.g., rotation about a central axis, movement up and down, movement laterally, etc.) can change and/or otherwise alter the drainage state. Additionally or alternatively, the drainage subsystem can be operated in absence of a rod mechanism and/or with any other components (e.g., set of magnets and/or electromagnets which open and close the valve through magnetic and/or electromagnetic forces, sliding mechanisms which can open and close a drainage hole through sliding into different configurations, a puncturable cover over the drainage hole, etc.) and/or combination of components.

Figure 14:
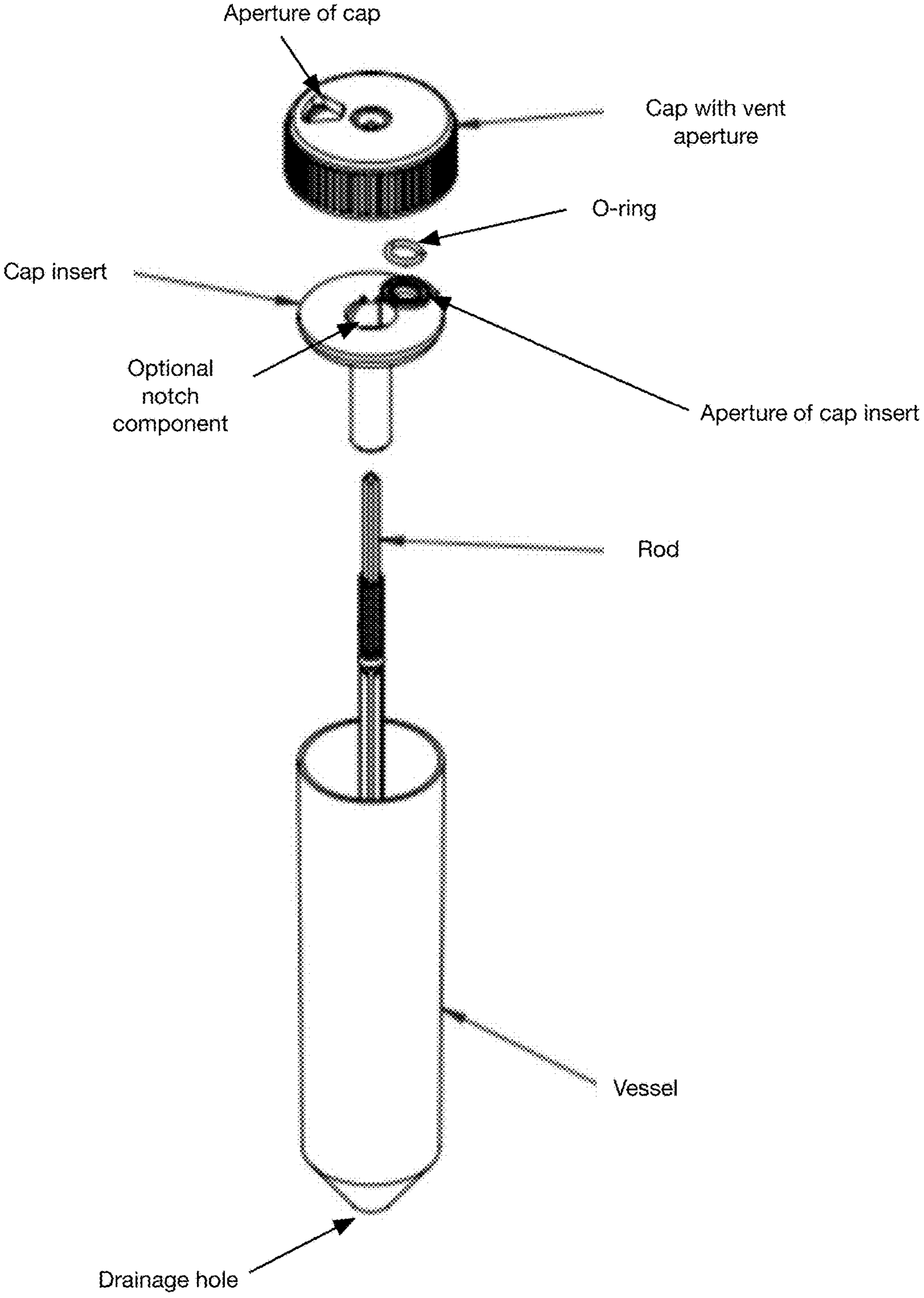
FIG. 14 depicts an exploded view of a variation of a system for buoyant separation.

In a preferred set of variations (e.g., as shown in FIGS. 3A-3B, as shown in FIGS. 13A-13C, as shown in FIG. 14, etc.), a rod is connected at one end to the valve and at the other end to a rotating mechanism (e.g., cap insert, knob overlaying cap, etc.) coupled to a cap (e.g., as described below), wherein twisting of the rotating mechanism in a first direction (e.g., clockwise, counterclockwise, etc.) lifts up the rod (e.g., as shown in the progression from FIG. 13B to FIG. 13C), thereby allowing drainage, and wherein twisting of the rotating mechanism in the opposing direction (e.g., counterclockwise, clockwise, etc.) lowers the rod, thereby sealing the drainage hole(s) and stopping drainage. The cap subsystem can optionally be configured (and/or the cap subsystem can include a cap insert which is configured) to control the degree to which the rod can be rotated (e.g., as described below), and therefore control (e.g., limit) the height at which the valve can be lifted above the drainage hole (e.g., height of gap shown in FIG. 13C corresponds to angle of cap turn). This height can affect the flow rate at which materials exit the separation container, and as such, the cap subsystem and/or cap subsystem insert can be configured such that the cap subsystem cannot be rotated past this optimal height. In some specific examples (e.g., as shown in FIG. 14), for instance, a ramp feature (e.g., ramp) is defined in the cap subsystem and/or the cap subsystem insert such that rotation of the cap subsystem stops once this optimal height or set of heights is reached. In a particular specific example, a ramp is defined in an interior portion of the cap insert, where a protrusion defined at an interior surface of the cap traces along (e.g., up) the ramp during rotation of the cap relative to the cap insert (e.g., in a particular direction) and optionally comes to a stop at the top of the ramp (e.g., based on hitting a wall at the top of the ramp). In the particular specific example, the ramp is preferably defined along a curved interior wall of a hole in a superior surface of the cap insert, where a protrusion defined at an inferior surface of the cap traces along this curved ramp as rotation occurs. Additionally or alternatively, the drain stop can be lifted to a spectrum of heights (e.g., for collection of different target materials, for different separation container contents, for collection of different-sized materials, for different collection times, etc.), a diameter of the drainage hole can be variable and/or optimized to achieve an optimal flow rate and/or set of flow rates, and/or the system can be otherwise configured and/or implemented. In the example shown in FIG. 14, for instance, a cap with a vent aperture is used with a cap insert for enabling and optionally controlling rotation of the rod axis (e.g., based on relative rotation between the cap and the cap insert), wherein an optional notch component (e.g., ramp) can be defined at a surface of the cap insert to control (e.g., stop) rotation. An O-ring can further be implemented, which can surround an aperture of the cap insert to limit slipping between the cap and the cap insert.

A height of the ramp feature preferably corresponds to a desired height of the drain stop above the drainage hole (e.g., as described below), such that travel of the protrusion all the way up the ramp achieves this particular height. In preferred variations, for instance, the height of the ramp is equal to this desired height. Additionally or alternatively, a height, slope, or other features of the ramp can be otherwise configured.

In variations including a rotatable rod, the rod is preferably made from one or more materials which are able to withstand rotational torsion as well as overcome the static friction of the drain stop (e.g., relatively compliant drain stop) over the height of the separation container (e.g., up to 12 centimeters, up to 15 centimeters, up to 20 centimeters, between 5 and 20 centimeters, greater than 20 centimeters, etc.). The rod mechanism can optionally be limited to a maximum rigidity, such that the rod is not too rigid that it exerts too strong of forces pushing up on the cap subsystem (e.g., causing it to pop off of the separation container). Additionally, the materials of the rod (and/or any other components of the separation container) can be configured for any or all of: life sciences applications, biological applications, medical applications, sterile and/or partially sterile applications, manufacturing applications, and/or any other applications and/or combination of applications.

In specific examples, for instance, the rod mechanism includes one or more polymer materials (e.g., thermoplastic polymers), such as, but not limited to: polycarbonate and Acrylonitrile butadiene styrene (ABS), composites of multiple polymers, and/or any other polymers. Additionally or alternatively, the rod can be made from any or all of: elastomer materials, metallic materials, glass, any organic materials, any synthetic materials, wood, and/or any other materials or combination of materials.

The rod mechanism can optionally include and/or define one or more notches and/or protrusions along its length, which can function to control and/or limit an amount of rotation (e.g., and a subsequent height of a drain stop) permitted for a cap subsystem (e.g., as described below). In a set of variations (e.g., as shown in FIGS. 15A-15B), a protrusion at a particular height of the rod functions to limit the height to which the drain stop can be lifted above the drainage hole. As shown in FIGS. 15A-15B, for instance, a shaft protrusion can be implemented that limits raising of the shaft (e.g., to a predetermined height, to a maximum height, etc.).

The rod mechanism can optionally interface with a spring, which functions to provide resistance to the rod mechanism as well as return it to its initial configuration (e.g., where in the drain stop is in a closed configuration), such as in response to release of the cap subsystem (e.g., as described below).

Additionally or alternatively (e.g., as shown in FIGS. 4A-4C), the rod can be connected to the drain stop and to a translatable mechanism, wherein translation of the translatable mechanism (e.g., movement up and down) changes the drainage state of the separation container. In the example shown in FIGS. 4A-4C, for instance, the buoyant particles and buffer solution mix in the separation container (e.g., with centrifugation), causing a pellet to form at the bottom of the separation container. By pulling the top of the rod (e.g., cannula) to open the valve, the pellet and buffer drain out of the tube, optionally into a drain container. The valve is preferably then closed (e.g., actively, passively, etc.) before the buoyant particles pass through. The drain container can then optionally be removed and/or aspirated (e.g., for applications of negative selection), such as with a needle.

Figure 5:
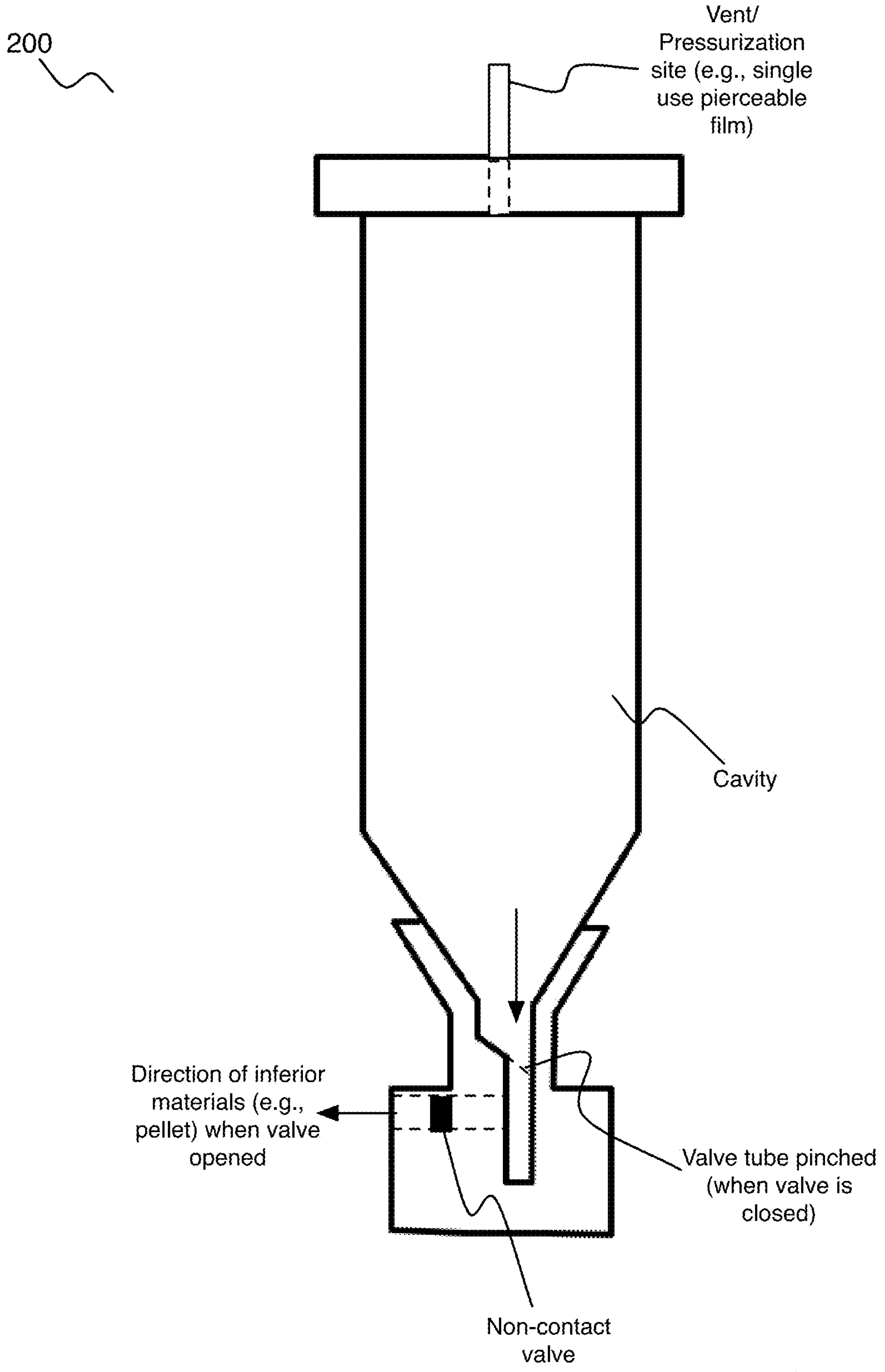
FIG. 5 depicts a variation of a system for buoyant separation implementing a drainage mechanism with a non-contact valve.

Further additionally or alternatively (e.g., as shown in FIG. 5), a non-contact valve can be used, which is used in absence of a rod or other mechanism coupled to the valve. This can have the benefit, for instance, of preventing a pellet formed at the inferior region from adhering to, getting stuck on, and/or otherwise having its motion out of the separation container be impeded by a valve which it contacts (e.g., a ball valve). In the example shown in FIG. 5, for instance, a vent/pressurization site can be opened (e.g., punctured), which opens up a valve tube (e.g., wherein the valve tube is pinched in the "closed" configuration)—the pellet can then flow through this valve tube and out the non-contact valve, such that the pellet is the first material to exit the valve.

Further additionally or alternatively, the valve can be operated with any other mechanical activation (e.g., in absence of a valve), with passive activation, with electrical activation, with magnetic activation, with chemical activation, with inflation activation, with centrifugal activation, with an automated mechanism, with any other activation, and/or otherwise suitably operated.

In additional or alternative variations, the collection subsystem can include an aspiration subsystem 214, wherein the aspiration subsystem enables materials to be aspirated from the separation container. The materials are preferably aspirated through a superior component and/or region of the separation container (e.g., a cap, a superior opening, etc.), but can additionally or alternatively be aspirated from an inferior region, a side wall, and/or any other region(s). In specific examples, for instance, a cannula is attached to a cap subsystem of the separation container, where materials can be aspirated through the cannula and removed from the separation container.

Figure 6A:
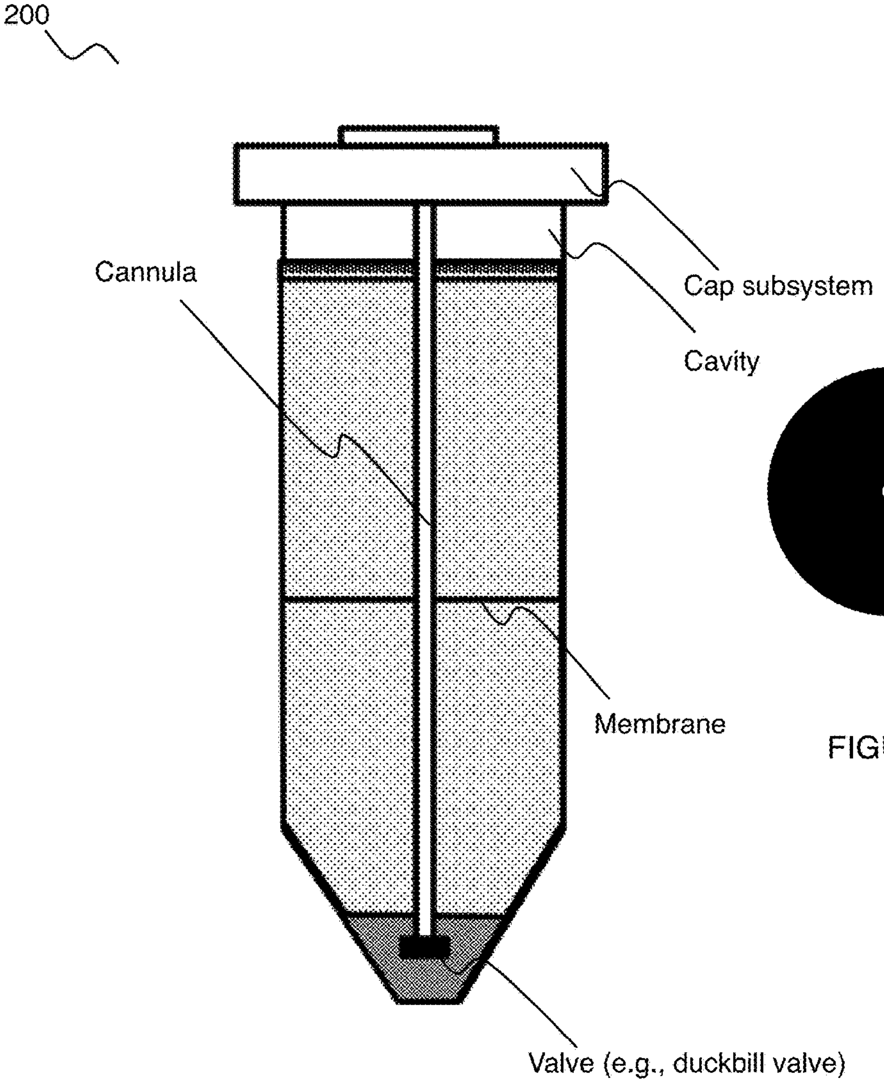
FIGS. 6A-6B depicts a variation of a system for buoyant separation implementing an aspiration mechanism.

The aspiration subsystem preferably includes a cannula and/or other hollow rod, which functions to enable aspiration of materials from the separation container. In some examples (e.g., as shown in FIG. 6A), the cannula runs along a majority of the length of the separation container, such that the cannula enables aspiration of materials inferior to the buoyant particles (e.g., non-target materials in the case of positive selection, target materials in the case of negative selection, etc.), such as with a syringe and/or pipette tip which can be inserted through the cannula (e.g., and used to pierce a duckbill valve for collection). This embodiment can have the benefit of not having to disturb and/or pass through the microbubble layer (e.g., once it is formed). Additionally or alternatively, the cannula can have a length less than a majority of the length of the separation container (e.g., to aspirate buoyant materials, to optimize flow conditions when aspirating non-buoyant materials, etc.), the cannula can have a variable and/or adjustable length (e.g., cannula is able to move up and down, cannula is able to retract and extend, etc.), there can be multiple cannulas (e.g., of varying lengths, of varying widths, of the same length, of the same width, etc.), and/or materials can be aspirated from any other materials.

The internal width (e.g., diameter) of the cannula can be configured to permit a certain size and/or subset of materials (e.g., smaller than buoyant particles). Additionally or alternatively, the width of the cannula can be greater than all materials and/or otherwise sized.

The cannula can optionally be coupled to and/or interface with one or more valves, wherein the valves function to control the aspiration state (e.g., on vs. off, flow rate, etc.) of the cannula. Additionally or alternatively, the valve(s) can function to enable the separation container to be mixed (e.g., end-over-end [EOE] mixed, centrifuged, mixed with a gyroscope, rotated, etc.) without materials flowing out of the separation container. In preferred examples, for instance, the cannula is always present in the separation container (e.g., when materials are introduced, prior to separation, during separation, after separation, etc.), which prevents disruption to the microbubble layer formed during separation, which can be caused by piercing the microbubble layer with a cannula or pipette tip. To prevent materials from exiting the separation container during a separation (e.g., centrifugation process) and/or mixing process (e.g., mixing the contents of the separation container, inverting the separation container, etc.), one or more valves can be used with the cannula to control flow through it. The valve(s) can be arranged at any or all of: an inferior region of the cannula, at a superior region of the cannula, at multiple regions of the cannula, and/or at any other locations.

In specific examples, a valve (e.g., a duckbill valve at an inferior opening of the cannula) is used which is closed during separation, and which can then be opened (e.g., actively, passively, through piercing of the valve, through application of negative pressure, etc.) to collect materials.

Additionally or alternatively, materials can be otherwise aspirated and/or otherwise collected.

Figure 19A:
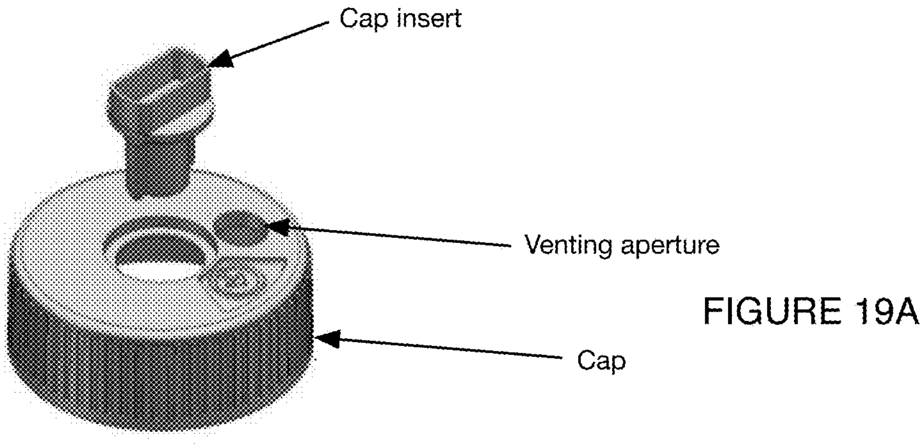
FIGS. 19A-19E depict a variation of a system for buoyant separation with an interfacing collection container.
Figure 19B:
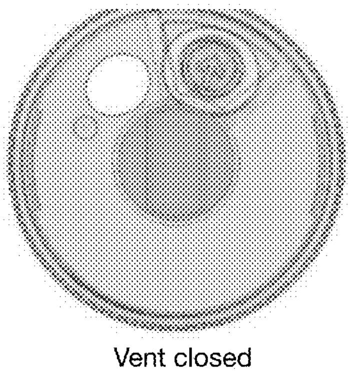
Figure 19C:
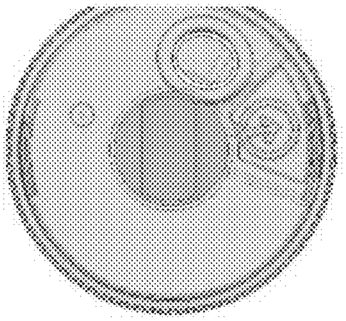
Figure 19D:
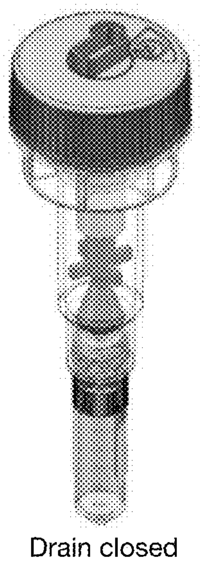
Figure 19E:
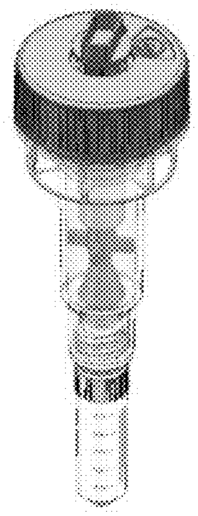

The collection subsystem can optionally include and/or interface with one or more collection containers (e.g., as shown in FIGS. 4A-4C, as shown in FIGS. 19A-19C, etc.), which function to collect materials which have been removed from the separation container. Additionally or alternatively, any number of collection containers can be used in conjunction with aspiration and/or other collection mechanisms. In a specific example, a separation container for drainage has a valve which is closed during centrifugation, wherein a pellet forms in the valve during this process. When the valve opens, the pellet drains into a first collection cavity. As the fluid level rises in the first collection cavity, the remaining fluid can then flow into a second collection cavity (e.g., larger than the first). The buoyant particles can then remain in the original separation container and be collected.

Additionally or alternatively, the collection subsystem can include and/or interface with any other components.

3.3 System—Cap Subsystem 230

The separation container can optionally include and/or interface with a cap subsystem 230, wherein the cap subsystem preferably functions to seal and/or partially or selectively seal (e.g., during centrifugation, with venting, etc.) a cavity of the separation container from the external environment. Additionally or alternatively, the cap subsystem can function to: limit, control, and/or prescribe particular heights of the drain stop above the drainage hole which in turn function to achieve particular flow rates of materials leaving the separation container; support one or more collection components (e.g., as described below); support other components; enable pressure differences to be achieved within the cavity; enable materials to be added to and/or removed from the separation container (e.g., through an aperture of the cap); and/or can perform any other functions.

The cap subsystem is preferably removably couplable with the separation container, wherein this arrangement can function to: enable the addition (e.g., efficient addition) of materials to the separation container; enable the removal of materials from the separation container (e.g., after separation, removal of buoyant particles, etc.); enable cleaning and/or re-use of a separation container; and/or confer any other functions.

Additionally or alternatively, any or all of the cap subsystem (e.g., cap, cap insert, etc.) can be permanently and/or irreversibly coupled with the separation container and/or components of the separation container (e.g., rod), which can function to: prevent user error in coupling the cap with the separation container, prevent erroneous separation of the cap subsystem from the separation container (e.g., during centrifugation), and/or perform any other functions. In some examples, for instance, materials can be removed from and/or added to the separation container through an aperture (e.g., sealable aperture, vent hole, etc.) in the cap subsystem.

The cap subsystem preferably interfaces with (e.g., is coupled with) the rod mechanism, such that movement of the cap subsystem (e.g., rotation, translation, etc.) effects movement in the drain stop through the rod mechanism (e.g., which is coupled to both the drain stop and the cap subsystem). Additionally or alternatively, the drain stop can be moved in absence of the rod mechanism, and/or the components can be otherwise arranged.

The cap subsystem can optionally include multiple components, which can further optionally interface and/or interact with each other so as to perform certain functionalities associated with the cap subsystem. Alternatively, the cap subsystem can include a single component.

In a preferred set of variations, the cap subsystem includes a cap insert and a cap that is overlaid over part or all of the cap insert (e.g., as shown in FIGS. 13A-13C, FIG. 14, FIGS. 17A-17C), wherein rotation of the cap relative to the cap insert causes rotation of the rod mechanism. In specific examples, for instance, the rod mechanism is attached to the cap and runs through the cap insert, such that rotation of the cap moves the rod mechanism (e.g., without moving the cap insert). The cap insert can optionally function to control, enable, and/or limit the rotation of the cap, so as to achieve optimal drainage flow rates through an optimal height of the drain stop above the drainage hole (e.g., as described below). Additionally or alternatively, the cap and cap insert can perform any other suitable functions. Further additionally or alternatively, the cap subsystem can include other components, more components, a single component, and/or any combination of components.

Figure 17A:
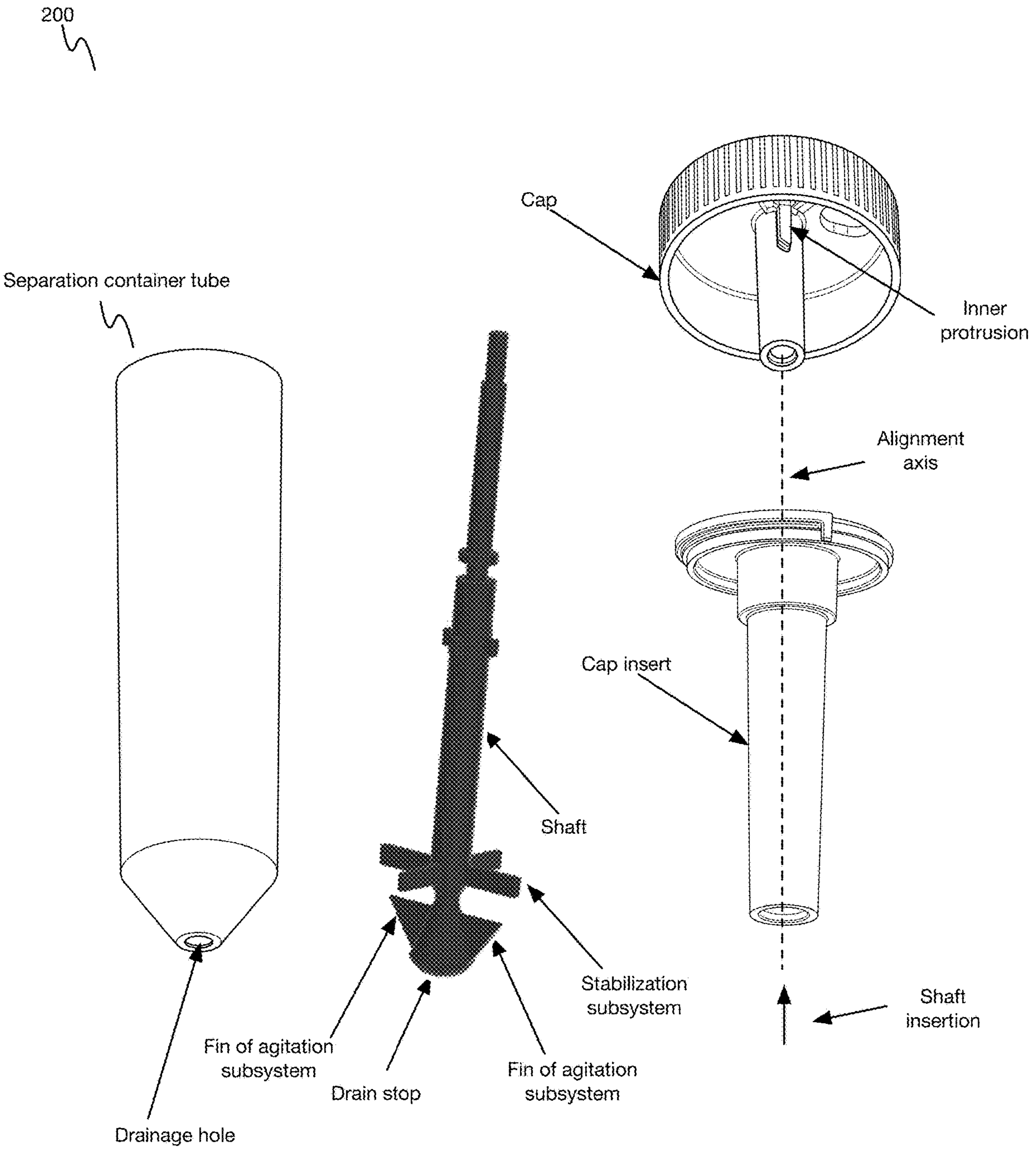
FIGS. 17A-17B depict a variation of system for buoyant separation having a cap subsystem with a ramp feature.
Figure 17B:
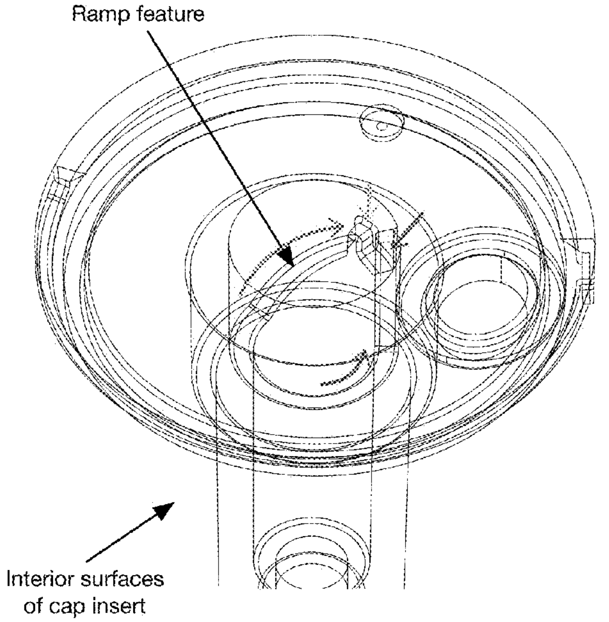
Figure 17B:
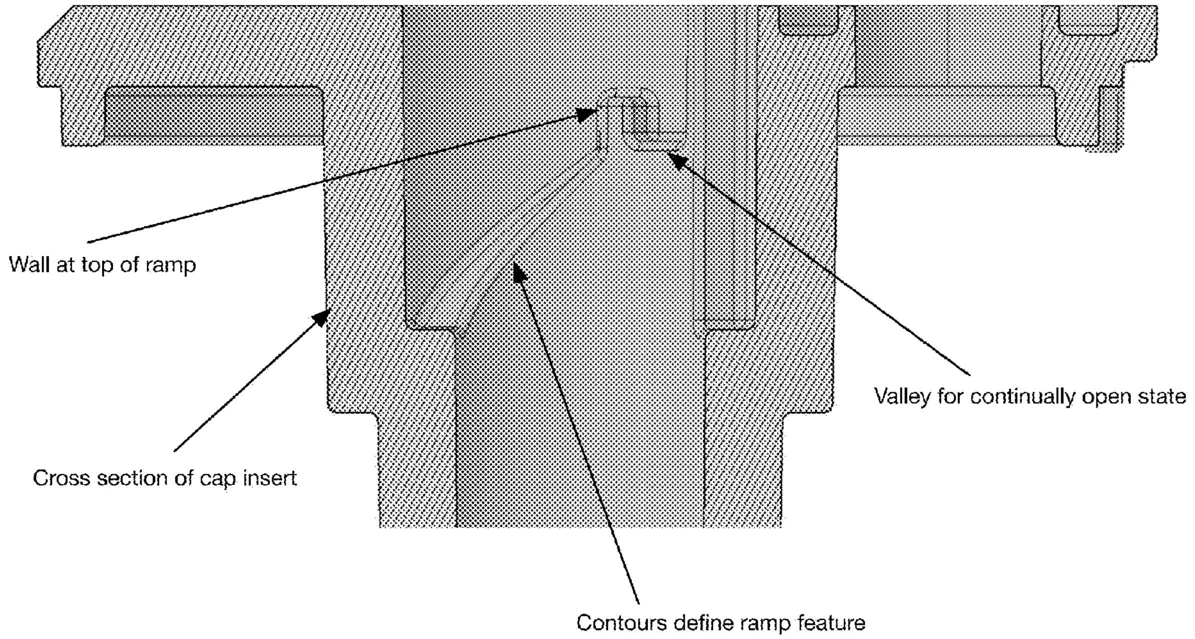

In some variations, the cap subsystem optionally defines a ramp or other mechanism (e.g., internal notches for controlling an amount of rotation of the cap subsystem (e.g., cap) (e.g., to achieve an optimal height of the drain stop above the drainage hole). In examples, the cap insert defines an internal ramp feature (e.g., as shown in FIGS. 17A-17B), which the cap interfaces with (e.g., moves along) as it rotates. The ramp is configured to end and stop further lifting of the drainage hole at a particular location which corresponds to an optimal height of the drain stop above the drainage hole (e.g., to achieve an optimal flow rate). Additionally or alternatively, the ramp can enable further movement, the system can include multiple ramp inserts (e.g., to enable multiple optimal heights to be achieved such as depending on the contents and/or volume of the separation container or the particular application), and/or the system can be otherwise suitably configured.

Figure 18:
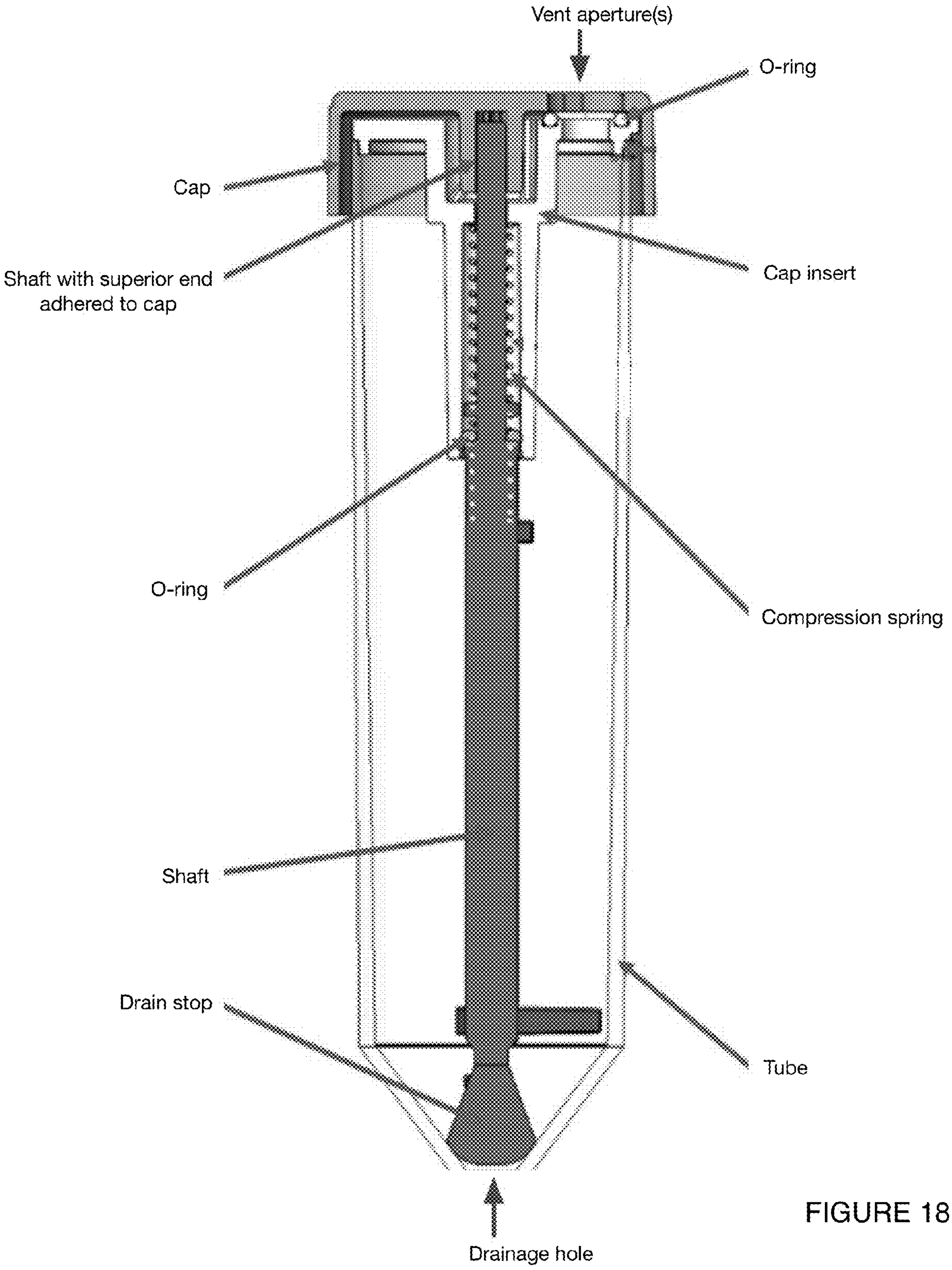
FIG. 18 depicts a variation of a system for buoyant separation.

The ramp or other mechanism can further optionally function to control and/or limit a time duration for which the system is in a "draining" configuration. In some variations, for instance, upon reaching the end of the ramp, the cap subsystem can be released (e.g., by the user, by an automated instrument, etc.), and in response, the cap will rotate in the opposing direction (e.g., down the ramp, at a speed depending on the slop of the ramp, for a duration depending on the length of the ramp, etc.) to revert to a closed configuration. This can function, for instance, to enable particular (e.g., short, controlled, etc.) durations of time for which materials are draining from the separation container. In examples in which a pellet or other materials proximal to the drainage hole are desired to be drained, this can function to prevent other materials and/or a large amount of other materials (e.g., buffers, buoyant particles, etc.) from being drained with the desired materials. In specific examples, a spring component (e.g., as shown in FIG. 18) further interfaces with the cap subsystem and the rod mechanism, such that this effect is reliably and efficiently achieved.

The cap subsystem preferably functions (e.g., as described above) to enable lifting and/or lowering of the drain stop, such as through use of a rod mechanism (e.g., rotatable rod, translatable rod, etc.), but additionally or alternatively through any other mechanisms. The cap subsystem further preferably functions to enable, achieve, control, manage, and/or limit any or all of: a height of a drain stop above a drainage hole; a flow rate of materials through a drainage hole (e.g., when the drain stop is lifted above the drainage hole); a type of materials which are able to pass through a drainage hole; a time duration for which materials can be drained from the separation container before the drainage hole is sealed (e.g., with the drain stop); a speed at which a drainage hole is opened and/or closed; and/or any combination.

In preferred variations, for instance, the cap subsystem and/or any other components or features of the system (e.g., cap subsystem collectively with drainage hole size and drain stop features) are configured for achieving an optimal flow rate of materials through the drainage hole for collection after separation or other processes. The flow rate can be determined and/or affected based on any or all of: a size (e.g., area, diameter, etc.) of the drainage hole, a height of the drain stop above the drainage hole, a shape of the drain stop, a speed at which the drain stop is raised, an amount (e.g., volume, height, weight, etc.) of materials which are present in the separation container, and/or any other factors or combination of factors.

In some variations, for instance, the system is configured for use in draining a pellet (e.g., cell pellet) or other aggregated materials (e.g., resulting from a centrifugation step, produced as a result of a settling process at the bottom of the separation container, etc.) from the drainage hole. In specific examples, a centrifugation process is used to produce a pellet (e.g., cell pellet) at an inferior region of the separation container (e.g., proximal to the drainage hole), which can be optimally and efficiently drained through the drainage hole(s) based on features and/or configurations of the cap subsystem. For instance, in draining a pellet (e.g., a cell pellet) or other material, certain flow rates (e.g., flow rates above a predetermined threshold, flow rates within a predetermined range, flow rates below a predetermined threshold, etc.) of materials exiting the separation container facilitate optimal (e.g., efficient, highest yield, quickest, etc.) drainage of the pellet. This can prevent and/or limit the amount of other materials (e.g., non-pellet materials, undesired materials, etc.) which are collected through the drainage hole (e.g., in a particular amount of time during which the drainage hole is in an open configuration, maximize the amount of pellet which is able to be collected (e.g., in a particular amount of time), prevent the pellet from fracturing into multiple pieces, and/or confer any other benefits. Additionally or alternatively, the system can be configured to remove any other materials in any suitable forms.

Figure 16A:
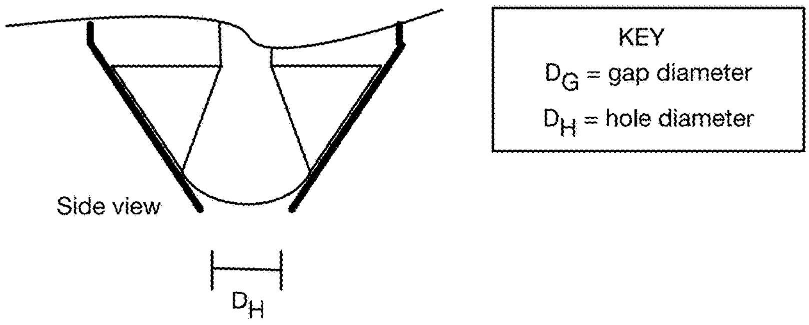
FIGS. 16A-16C depict a variation of various configurations of drainage of a separation container.
Figure 16B:
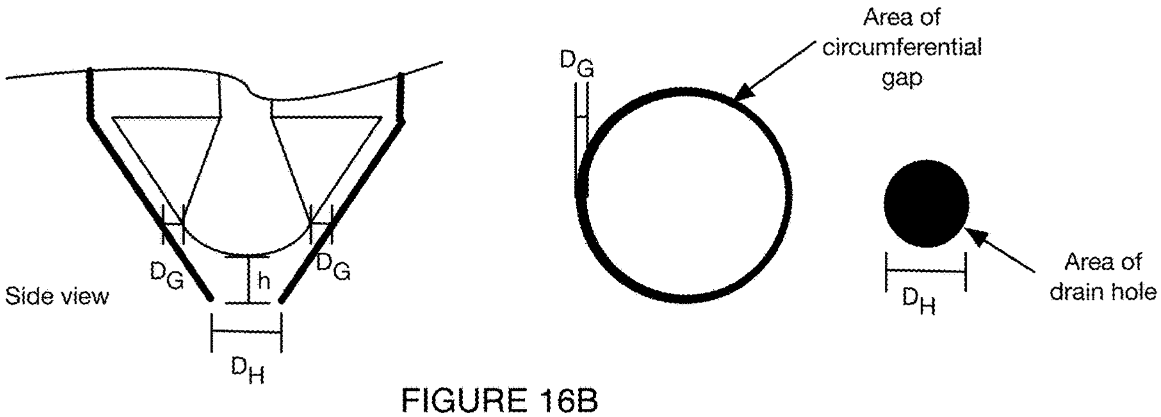
Figure 16C:
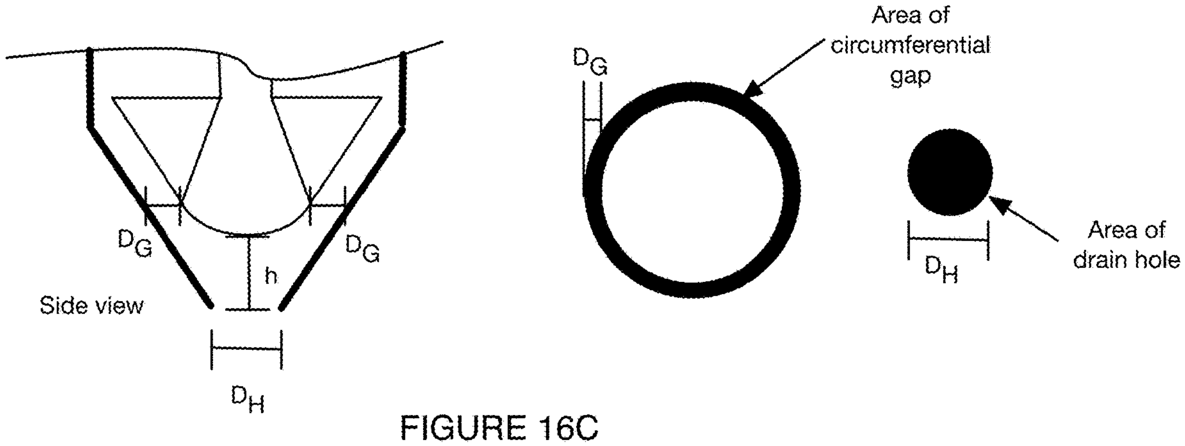

In achieving suitable and/or optimal flow rates, the cap subsystem is preferably configured (e.g., through utilization of a rod mechanism) to facilitate movement of the drain stop (e.g., between open and closed configurations, to one or more heights above the drainage hole, etc.). In preferred variations, the cap subsystem is further preferably configured to enable a particular height and/or set of heights of the drain stop above the drainage hole (e.g., as shown in FIGS. 16A-16C) to be achieved, wherein the particular height and/or set of heights is/are configured to achieve optimal flow rates and/or compositions of materials through the drainage hole during a drainage process. For instance, the cap subsystem can be configured to encourage, enable, and/or force the drain stop to move to a particular height corresponding to an optimal flow rate when moved into the open configuration. In examples, rotation of the cap subsystem in a particular direction moves the drain stop from the closed configuration to an open configuration, where once an optimal height of the drain stop above the drainage hole is reached, the cap subsystem can do any or all of: indicate that the optimal height has been reached (e.g., through a tactile indicator such as a "click" or change in resistance of rotating the cap subsystem), prevent the drain stop from moving further (e.g., as described above), initiate a return of the drain stop back to a closed configuration (e.g., as described above), and/or otherwise facilitate achievement of an optimal height or heights.

Determining and/or specifying the optimal height and/or heights for the drain stop relative to the drainage hole can be any or all of: predetermined (e.g., based on a set of applications and/or use cases for the separation container, based on average and/or maximum fluid volumes of the separation container, etc.), dynamically determined (e.g., based on a dynamically determined volume of materials in the separation container, based on the contents of the separation container, based on a set of models and/or algorithms, etc.), and/or any combination.

Additionally, the flow rate(s) and/or associated height(s) can further be determined (e.g., predetermined, dynamically determined, etc.) based on and/or depend on any or all of: a size (e.g., diameter) of the drainage hole, a shape (e.g., cross-sectional shape) of the drainage hole, a location of the drainage hole (e.g., centered at an inferior-most region, off-centered, at an inferior-most region, versus not an inferior-most region, etc.), a number of drainage holes, a shape of the separation container (e.g., tapered vs. not tapered), a shape of the drain stop (e.g., slope of sides, etc.), a size of the drain stop (e.g., diameter), material and/or textural features of the drain stop (e.g., smooth surface vs. rough surface), a shape and/or volume of space formed between a raised drain stop and the drainage hole, and/or any other features.

In some variations, for instance, the optimal flow rate, and subsequently the height of the drain stop above the drainage hole, is determined based on multiple factors. For instance, to effectively (e.g., efficiently, at high yields, with minimal non-target materials, etc.) drain desired materials (e.g., a cell pellet), a minimum flow rate is required, and a limiting flow rate is determined based on a size of the drainage hole.

In a set of specific examples, for instance, a flow rate (equivalently referred to herein as a drain rate and/or drainage rate) of between 10-25 milliliters (mL) per second is achieved with a drainage hole diameter of between 1 and 7 mm (e.g., 5 mm) and with a drain stop which is arranged at a height between 2-6 mm (e.g., 3 mm) above the drainage hole, which collectively enable a cell pellet or other desired materials to be drained within a time period (e.g., less than 3 seconds, between 0.5 and 2 seconds, between 1 and 5 seconds, within less than 10 seconds, etc.). A ramp mechanism and/or other features of the system are preferably sized and/or chosen (e.g., with a particular slope for the ramp, with a particular length for the ramp, etc.) accordingly based on this height and/or other parameters. Additionally or alternatively, the flow rate can be between 1-25 mL, less than 1 mL, greater than 25 mL (e.g., between 25 and 50 mL, between 25 and 100 mL, etc.). Further additionally or alternatively, the drain stop height can include values outside of the range of 1-6 mm (e.g., less than 1 mm, greater than 6 mm, between 1-10 mm, between 1-15 mm, between 6-10 mm, between 5-15 mm, between 1-20 mm, any ranges in between, etc.).

Further additionally or alternatively, any or all of these ranges can be adjusted (e.g., scaled, weighted, etc.) to accommodate different sized separation containers.

The height of the drain stop above the drainage hole to achieve a desired flow rate is preferably determined, at least in part, based on flow properties which result from the drain stop being arranged at multiple different heights. For instance, the flow rate can be affected and/or determined by numerous factors depending on the arrangement of the drain stop relative to the drainage hole. For instance, when the drain stop is lifted substantially far away from the drain hole (e.g., such that any effects on flow rate from the drain hole are negligible or non-existent), the flow rate can be significantly (e.g., mostly, wholly, etc.) limited by the size (e.g., diameter) of the drainage hole. However, when the drain stop is lifted to a relatively small height (e.g., between 0-3 mm up from the drainage hole), the drain rate can be limited by an area of the region (e.g., as viewed along an inferior-superior axis) between the drain stop and the walls of the separation container (e.g., as shown as the area of circumferential gap in FIGS. 16A-16C). A threshold point of maximum fluid flow can be achieved when the area surrounding the drain stop and between the walls (e.g., donut shaped area for a drain stop and separation container having circular cross sections) matches the area of the drainage hole. In some embodiments, for instance, this maximum fluid flow rate was shown (e.g., for a 50 mL tube) to occur at an approximately 3 mm lift height. Additionally or alternatively (e.g., depending on the size of the separation container), this height could be greater than 3 mm, less than 3 mm, and/or have any value(s). In a set of example configurations shown in FIGS. 16A-16C, for instance, $D_G$ represents a gap diameter between the drain stop and the walls of the separation container, while $D_H$ represents a diameter of the drainage hole, where: in FIG. 16A, the cap configuration is sealed, and $D_G$ is equal to zero, indicating no flow through the drainage hole; in FIG. 16B, the cap is configured in a partially open configuration (e.g., open to an intermediate point of the ramp), and the area of the circumferential gap is less than the area of the drain hole; in FIG. 16C, the cap is configured in a fully open configuration (e.g., open to the stop point at the top of the ramp), and the area of the circumferential gap is equal to the area of the drain hole.

The cap subsystem can optionally additionally include any number of supplementary features.

The set of supplementary features can optionally include one or more venting features which are configured to enable venting of the contents (e.g., release pressure from) of the separation container, which can in turn function to assist with drainage of target materials and/or any other processes. The venting features are preferably arranged at (e.g., defined by) the cap subsystem, but can additionally or alternatively be part of any other components.

In some variations, such as those in which the cap subsystem includes multiple components, a venting feature or features can be incorporated into multiple components (e.g., cap and cap insert), such that the multiple components collectively provide and/or enable venting of the separation container. In a set of examples (e.g., as shown in FIG. 14), for instance, a first vent aperture can be arranged in the cap insert and a second vent aperture can be arranged in the cap, such that venting of the separation container occurs when a gap is formed and/or increased in size between the cap insert and the cap, such that an air flow path is established between the separation container, the first vent aperture, and the second vent aperture. In this example, the venting preferably occurs when the first and second vent apertures are not aligned (e.g., not overlaid), where the first and second vent apertures are aligned in a configuration in which materials can be loaded into (and/or collected from) the separation container. In additional or alternative examples, the first vent aperture overlaps with (e.g., partially overlaps with, fully overlaps with, etc.) the second vent aperture during venting.

Venting of the separation container can be any or all of: manually triggered (e.g., based on a user manually aligning the vent apertures), automatically triggered (e.g., based on an automated instrument aligning the vent apertures), triggered by and/or during another process (e.g., rotation of the cap), and/or any combination.

In some variations, for instance, rotation of the cap (e.g., in a direction for draining) along a ramp of the cap insert causes an increased gap between the cap insert and the cap to form, thereby enabling air to flow through the first vent aperture into this gap and through the second vent aperture. In specific examples, as the cap travels along the ramp of the cap insert and the drain stop starts moving upward, venting of the separation container occurs contemporaneously (e.g., in real time, in substantially real time, at overlapping times, etc.).

In additional or alternative variations, rotation of the cap subsystem (e.g., cap) to lift the drain hole into a draining configuration causes the vent apertures to overlap at an optimal time during that process (e.g., once the drain stop starts being lifted, prior to the drain stop being lifted, when the drain stop is maximally lifted, etc.) based on the positing of the vent apertures (e.g., such that they overlap at a particular angle of rotation of the cap subsystem), which thereby enables venting and/or maximal venting.

Additionally or alternatively, the system can be otherwise vented, operated in absence of venting, or otherwise suitably operated.

Additionally or alternatively, the cap subsystem can include any other suitable components.

3.4 System—Agitation Subsystem 220

The system can optionally include an agitation subsystem 220, which functions to assist in (e.g., maximize, optimize, etc.) collection of any or all of the materials of the separation container. Additionally or alternatively, the agitation subsystem can function to mix any or all of the contents of the separation container, overcome and/or prevent clogging of the separation container and/or drainage hole, and/or can be used in any other processes and/or for any other functions.

In a preferred set of variations, for instance, the agitation subsystem 220 functions to gently wipe away a pellet (e.g., leaving the pellet intact, breaking up the pellet, etc.) and/or break surface tension of the pellet with respect to an interior surface (e.g., interior walls) of the separation container, thereby increasing an ease and/or speed and/or yield (e.g., total yield, intact yield, etc.) of its collection through a drainage hole.

Additionally or alternatively (e.g., in variations in which the target material to be collected is suspected in the subnatant [e.g., rather than formed into a pellet]), the agitation subsystem can function to fix a clog which has occurred and prevents drainage (e.g., clogging of drainage hole).

The agitation subsystem can be arranged at any suitable locations and/or coupled to any suitable components, such as, but not limited to: coupled to the drain stop, coupled to a rod mechanism, coupled to interior walls of the separation container, free-floating in contents of the separation container, and/or otherwise suitably arranged.

The agitation subsystem can optionally be implemented through rotation, such as rotation of the rod mechanism. In some variations (e.g., as shown in FIGS. 13A-13C), for instance, the agitation subsystem includes a set of fins coupled to (e.g., defined by) the drain stop, where the fins can contact and/or come close to contacting the interior walls of the separation container during rotation, thereby helping facilitate any or all of: separation of the pellet from walls of the separation container, breaking up of the pellet into smaller pieces, assisting with drainage and/or drainage yield, and/or any other actions.

Additionally or alternatively, agitation can occur through translation, such as movement of the rod mechanism up and down.

Additionally or alternatively, the agitation subsystem can include any other components and/or be otherwise suitably implemented.

In a set of variations in which a pellet is formed in the separation container (e.g., during centrifugation), the agitation subsystem can be implemented in according with the following use case. In response to a centrifugation or setting process, buoyant particles (e.g., bound to non-target material) aggregate (e.g., form a microbubble layer) at the top of the separation container (equivalently referred to herein as a tube), with target material (e.g., cells) distributed between the subnatant and a pellet layer at the bottom of the tube. The centrifugation can optionally be in the category of a "quick spin", such that cells are gently directed towards the bottom of the tube. From this, a cell concentration gradient from the bottom of the tube through to ~5 mL below the buoyant particle layer is formed such that cells can be recovered during the drain (e.g., prior to buoyant particles passing through the drainage hole). In order to drain the subnatant in these conditions, the drain stop can have agitation fins that glide along the side of the tube to guide cells away from the tube wall or drain stop and into the subnatant to be drained. This agitation methodology can further be enabled by a tube cap design that allows greater than 180 degrees of rotation. With two fins, these enable the full circumference of the interior wall to be agitated prior to drain. Further, the drain stop is lifted through a rotation of the tube cap. This lift occurs over about 45 degrees (e.g., between 25-60 degrees), which enables the drain stop to be rapidly lifted (e.g., manually, automatically, etc.) to maximum height, enabling a drain of the most concentrated cellular subnatant with maximum flow rate (as the flow rate slows down with less fluid height in the tube). A further potential benefit of rotating the cap to drain is that the fins rotate during the opening of the drain. This can allow for extra flow over the cells that may be collected on the fin.

In another set of variations, the target materials are arranged in the pellet (e.g., a cell pellet).

In another set of variations, the target material is bound to the buoyant particles, which can be recovered upon draining the non-target materials (e.g., during a longer drainage period).

In yet another set of variations (e.g., for capturing RNA and/or DNA), the target material to be collected remains suspended in solution inferior to a layer of buoyant particles (e.g., in the subnatant solution arranged below the buoyant particles). In specific examples, when draining the contents of the separation container, the buoyant particles adhere to the walls of the separation container (e.g., polymer separation container, textured interior walls of separation container, etc.) as the fluid is drained, thereby preventing the buoyant particles from being collected through the drainage hole.

3.5 System—Supplementary Features 240

The system can optionally include one or more supplementary features S240, which can individually and/or collectively function to confer any number of benefits in operation and/or performance of the system.

Figure 6B:
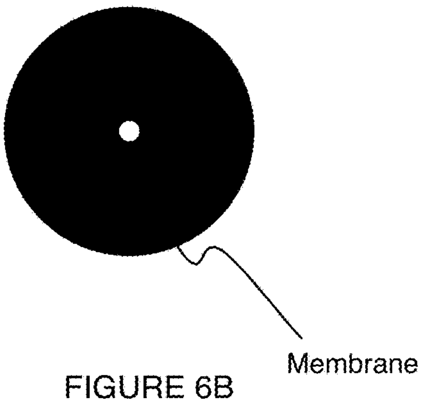

The separation container can optionally include and/or interface with a membrane (e.g., as shown in FIGS. 6A-6B), which can function to perform any or all of: preventing buoyant particles from collecting up and down the interior walls of the separation container, separating the floating layer from the rest of the materials, and/or performing any other function. The membrane can be any or all of: a solid membrane, porous membrane, liquid membrane, chemical membrane, organic membrane, inorganic membrane, mixed composition membrane, and/or any other membrane having any suitable material. The membrane can be any or all of: buoyant, neutrally buoyant, partially buoyant, and/or not buoyant. The membrane can be any or all of: rigid, flexible, and/or any combination.

The membrane is preferably used in combination with an aspiration collection mechanism, but can additionally or alternatively be used in combination with a drainage collection mechanism, with any other mechanisms or combination of mechanisms, alone, and/or otherwise used. Additionally or alternatively, any or all of the systems can be used in absence of a membrane, with multiple membranes, and/or otherwise configured.

In a preferred set of variations, a membrane is used within the separation container which has a specific gravity between water and that of the buoyant particles such that the membrane rises up slower than the buoyant particles, which effectively prevents the buoyant particles from adhering to the walls of the separation container (e.g., effectively wiping away the buoyant particles from the walls as they migrate upward) as other materials are collected from the separation container (e.g., through aspiration in the cap, etc.). In specific examples, the membrane is in the form of a flexible piece of plastic which has approximately the same cross section as the separation container (e.g., as shown in FIG. 6A and in the top-down view shown in FIG. 6B). This flexibility can function to enable buoyant particles which have fallen below the membrane to still rise above it.

Additionally or alternatively, a membrane can be used which is configured to remain above the buoyant particles, such that when materials are collected (e.g., drained) from an inferior region of the separation container, the membrane prevents the buoyant particles from sticking to the wall as they move down with the drained fluid.

Further additionally or alternatively, a membrane can be used which is attached to a rod (e.g., as described above) or other component, such that the membrane can be actively moved within the separation container. In some variations, for instance, the membrane is moved with the rod of a drainage mechanism during drainage.

Figure 8:
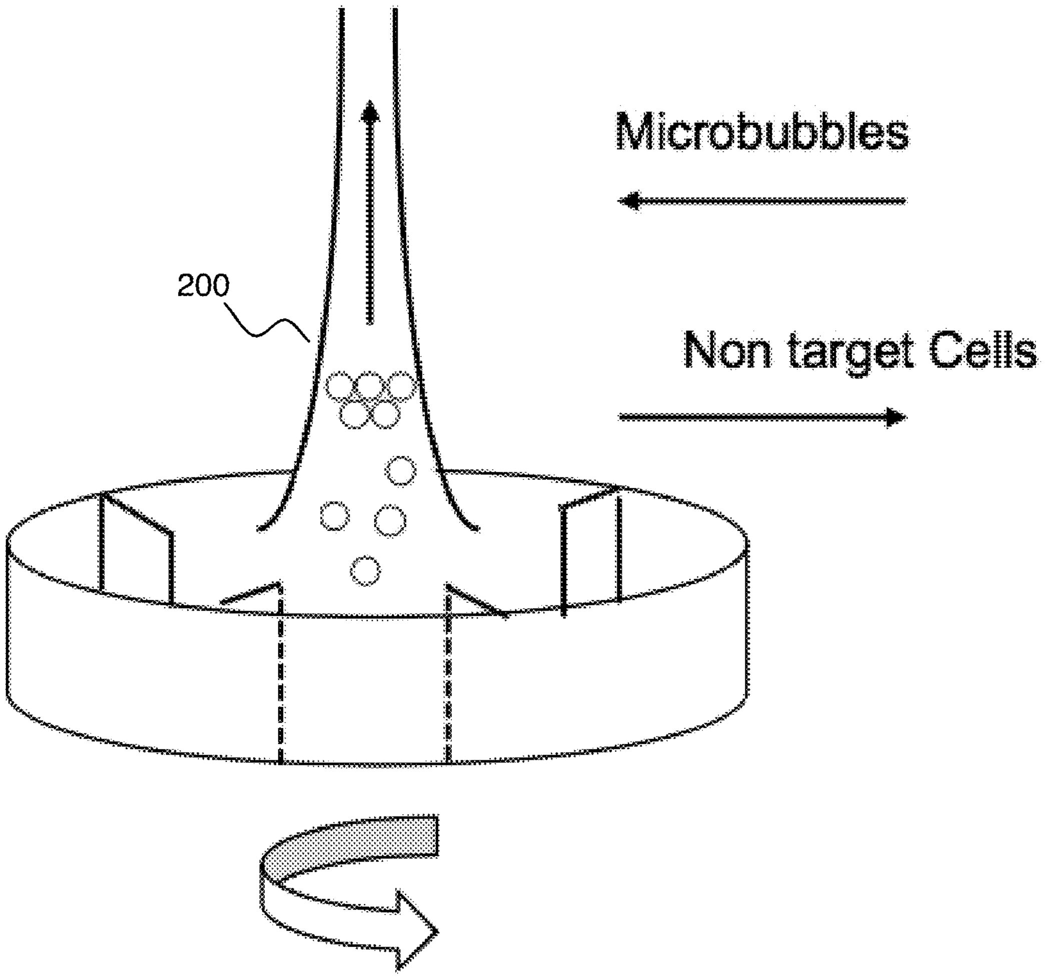
FIG. 8 depicts a variation of a system for buoyant separation implementing rotation with fins.
Figure 9:
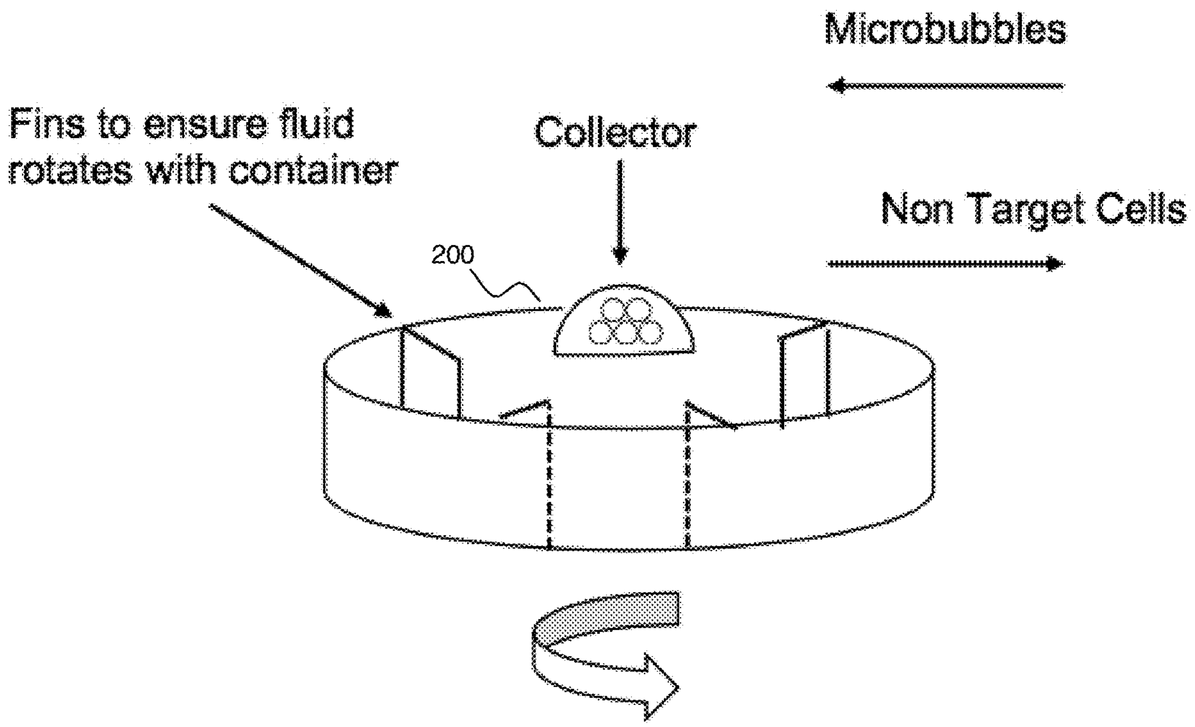
FIG. 9 depicts a variation of a system for buoyant separation implementing rotation with fins.

The separation container can additionally or alternatively include any other features or components configured to enable, assist with, and/or optimize any or all of: separation, collection, and/or any other processes. In some variations, for instance, this can include any or all of: surface features (e.g., fins, textured surfaces, coatings, etc.) on walls (e.g., interior walls) of the separation container. In a specific example (e.g., as shown in FIG. 8, as shown in FIG. 9, etc.), the separation container includes a set of fins or other surface features at interior walls of the separation container to ensure that the contents of the separation container move (e.g., rotate) with the container (e.g., during mixing). In the specific examples shown in FIG. 9, a separation container containing a central collection region is used to collect buoyant particles as the separation container rotates. In some implementations of this specific example, back-and-forth agitation of the separation container can be used to mix the contents of the separation container, wherein spinning is then used for the separation.

Figure 10:
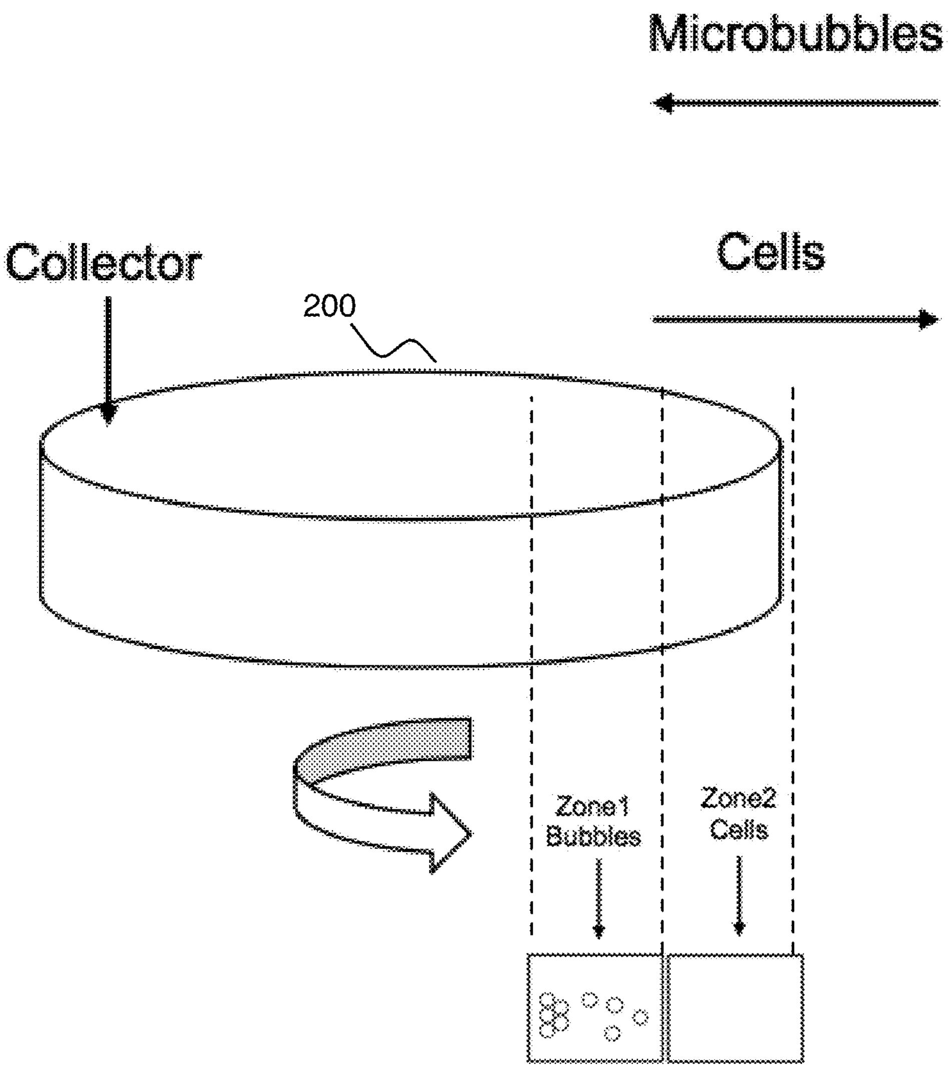
FIG. 10 depicts a variation of a system for buoyant separation implementing rotation without fins.
Figure 11:
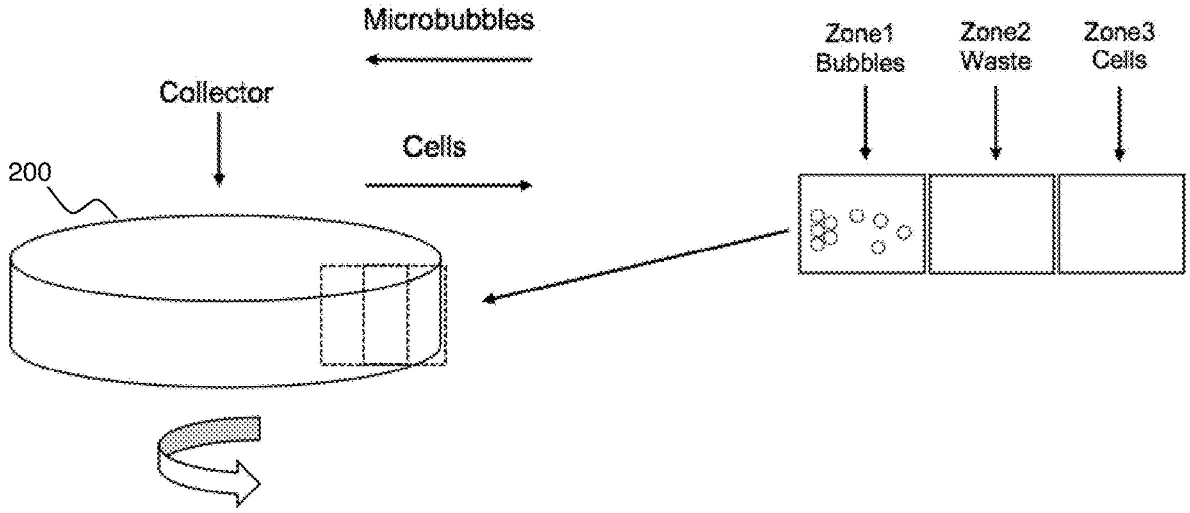
FIG. 11 depicts a variation of a system for buoyant separation implementing rotation without fins.

Alternatively, in the examples shown in FIG. 10 and FIGS. 12A-12B, the separation container can be used in absence of fins, wherein rotation of the container produces different zones having different materials, which can then be individually isolated and collected. In the specific example shown in FIG. 10, for instance, in the event that the separation container is full, the microbubbles and cells will move according to the arrows and zones shown. If the separation container is not full, the fluid will initially rise to the side walls when rotated at high speeds, and once the fluid is stable against the wall, the microbubbles will move inward to Zone 1. Additionally, as shown in FIG. 11, any number of zones can be formed.

The system can optionally include a centering mechanism (equivalently referred to herein as a stabilization subsystem) (e.g., as shown in FIGS. 13A-13C, as shown in FIG. 17A), which can function to: keep a rod and/or drain stop centered in the separation container during movement of the drain stop (e.g., so that it does not mis-align, so that the drain stop can be reliably and efficiently closed after a drainage process, etc.), prevent wobbling of the separation container during a centrifugation and/or mixing process, and/or can perform any other function(s).

Additionally or alternatively, the system can include any other components.

3.6 System—Automated Instrument 300

Figure 20:
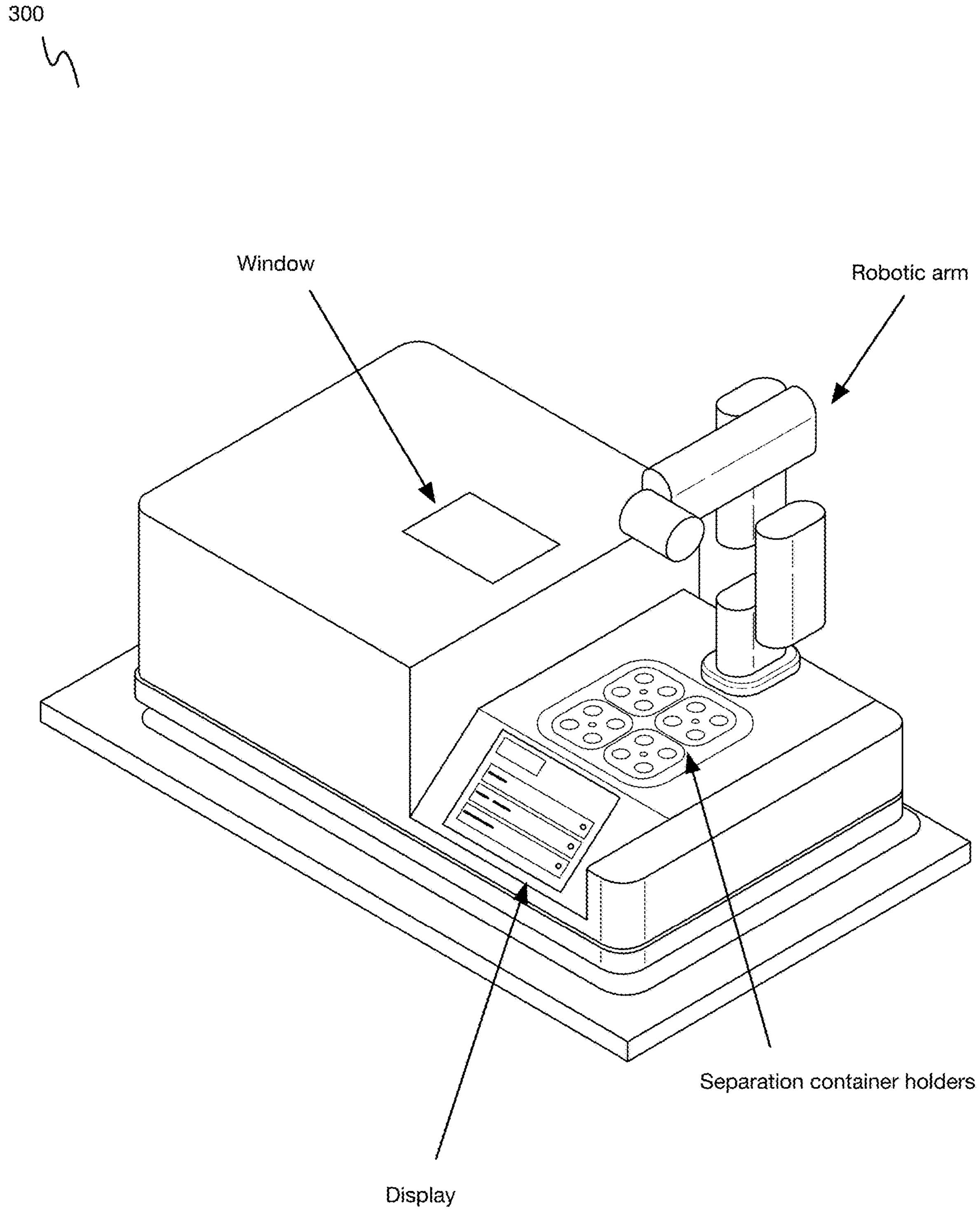
FIG. 20 depicts a variation of an automated instrument.

The system 100 can optionally include and/or interface with an automated instrument 300 (e.g., as shown in FIG. 20), wherein the automated instrument 300 functions to partially or fully automatically process the separation container and/or its contents. This can, in turn, function to increase efficiency of separation processes (e.g., by decreasing the time required to achieve separation as compared with manual processes), increase the yield of target material resulting from separation processes (e.g., by collecting a greater percentage of buoyant particles), increase the volume/throughput of separation able to be performed, and/or otherwise optimize the separation process (e.g., as compared to manual processes).

Alternatively, the separation container can be used in absence of an automated instrument 300. In some variations, for instance, the separation container is used in one or more manual processes, such as low-volume manual separation processes.

The automated instrument is preferably configured as a standalone and/or tabletop device, but can additionally or alternatively interface with other devices and/or be otherwise configured.

The automated instrument is preferably configured to receive and process multiple separation containers, further preferably multiple separation containers having different protocols (e.g., centrifugation protocols, mixing protocols, heating protocols, collection protocols, buffer/reagent additions, etc.). Additionally or alternatively, the automated instrument can be configured to process all separation containers uniformly.

The automated instrument can optionally include any or all of the following components: a fluid handling subsystem 310 (e.g., with robotic tools for fluid handling, conduits to receive and/or send fluids to the separation containers); a separation subsystem 325 (e.g., centrifugation subsystem including a centrifuge, spin subsystem, etc.); a mixing subsystem 320 (e.g., gyroscope, robotic arms, mechanical tools for inversion and/or other movement of the separation container, etc.); a temperature subsystem (e.g., for heating and/or cooling materials); a sensor subsystem 330 (e.g., to detect volume such that the device does not need to operate with only fixed volume commands, temperature, pressure, etc.); a processing and/or computing subsystem (e.g., to determine and/or execute automated commands); and/or any other components.

As such, the automated instrument can function to automate any or all of the following processes: fluid handling (e.g., adding buffers and/or other solutions to separation containers, draining materials from separation containers, aspirating materials from separation containers, etc.), centrifugation and/or other processes configured for separation of the contents of the separation container, mixing (e.g., end-over-end mixing, rotation, mixing with gyroscopic motion, etc.), and/or any other processing (e.g., heating, cooling, freezing, thawing, processing of captured target material, other protocols, etc.). In an example automated instrument shown in FIG. 20, for instance, the automated instrument can include: a display; separation container holders; a robotic arm (e.g., 6-degree-of-freedom) for task performance (e.g., mixing, twisting of cap, insertion and/or removal of materials, handling of separation container, etc.); and/or a window for accessing an inner chamber (e.g., including a separation subsystem, mixing subsystem, thermal subsystems, fluid flow subsystems, materials, etc.).

In a first variation, the system 100 includes an automated instrument which enables any or all of the processes involved in separation of materials with a draining separation container to be performed.

In a second variation, the system 100 includes an automated instrument which enables any or all of the processes involved in separation of materials with a aspiration separation container to be performed.

In a third variation, the system 100 includes an automated instrument which enables any or all of the processes involved in separation of materials with a bag separation container to be performed.

3.7 System—Variations

In a first variation, the separation container includes a drain subsystem, wherein materials from the separation container are drained through a set of one or more valves for collection after a separation process. Additionally, the separation container can optionally include a membrane which functions to prevent buoyant particles from lining the interior walls of the separation container as material is drained through the valves.

In a second variation, the separation container includes an aspiration subsystem, wherein materials form the separation container are aspirated through a cannula (optionally with a set of valves) after a separation process. Additionally, the separation container can optionally include a membrane which functions to prevent buoyant particles from lining the interior walls of the separation container as material is aspirated through the cannula.

In a third variation, the separation container includes a bag (e.g., a blood bag), wherein the bag is configured to separation and/or collection of materials resulting from separation through a set of seals and/or other mechanisms which divide the bag into multiple compartments. The bag can be any or all of: rigid, non-rigid (e.g., flexible), and/or any combination. The bag can additionally or alternatively have any number of ports and/or access points preformed before separation such that puncture of the bag is not required to access compartments. The bag can additionally or alternatively optionally be modified and/or processed such that the bag is configured to encourage buoyant particles that are stuck to the walls of the bag to be released (e.g., during a collection process). This can optionally include, for instance, treating the bag (e.g., interior surfaces of the wall) with a particular material and/or coating (e.g., reduced friction coating). Additionally or alternatively, this can include perturbing (e.g., vibrating) and/or otherwise manipulating the bag to encourage the bubbles to more quickly climb the interior surfaces of the bag. Additionally or alternatively, the bag can be otherwise configured. Further additionally or alternatively, any non-bag collection vessels (e.g., rigid tube vessels) can be configured as described.

Figure 12:
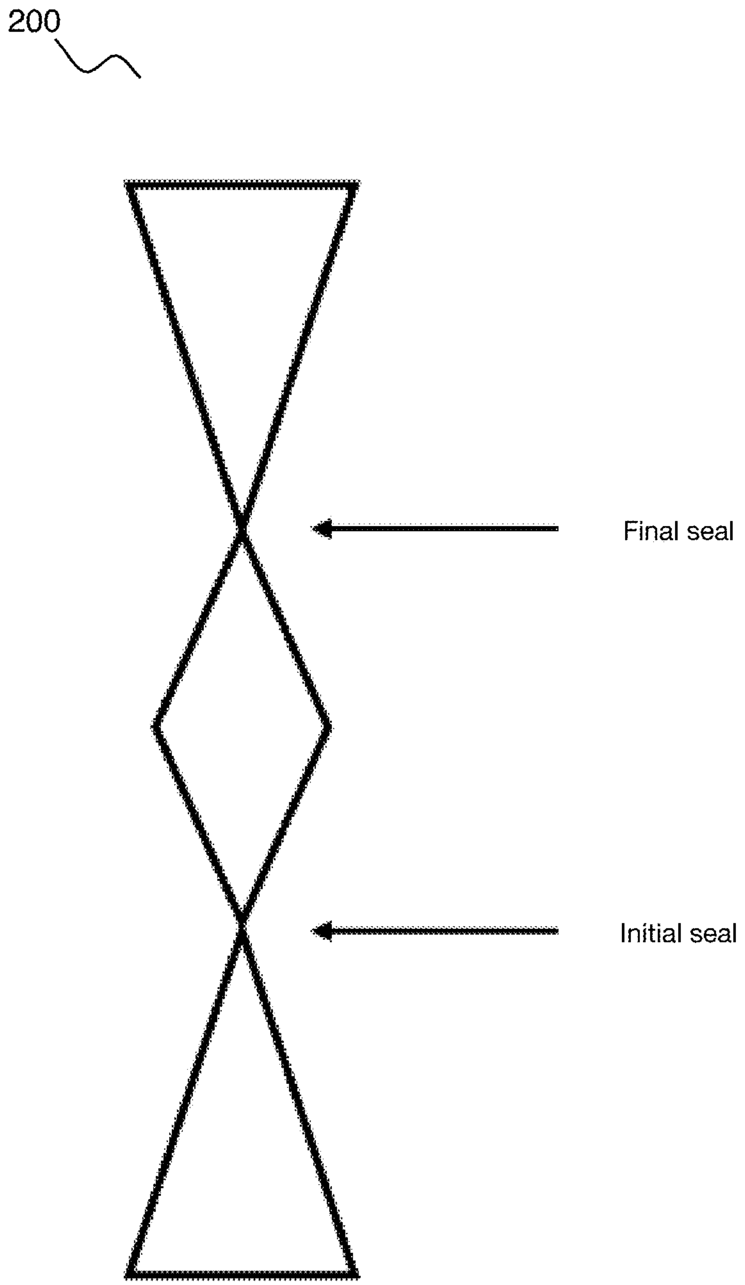
FIG. 12 depicts a variation of a system for buoyant separation implementing a bag.

In a first set of specific examples (e.g., as shown in FIG. 12), a bag includes a set of seals which can be implemented to maintain separation between buoyant particles and other materials. In the example shown in FIG. 12, a blood bag or equivalent is shown that has been pinched via dynamic control. The bag can be manipulated to move walls or create sealed compartments through heat sealing and/or physical proximity. In FIG. 12, an initial seal is shown which allows for compartmentalization of cellular release, a final seal is shown which allows for compartmentalization of released microbubbles.

In a second set of specific examples, additional or alternative to the first, the bag includes one or more valves which enables materials to be drained from the bag.

Additionally or alternatively, the separation container can include any other components and/or be otherwise configured.

Further additionally or alternatively, any or all of the separation containers can optionally interface with an automated device 300.

Figure 21:
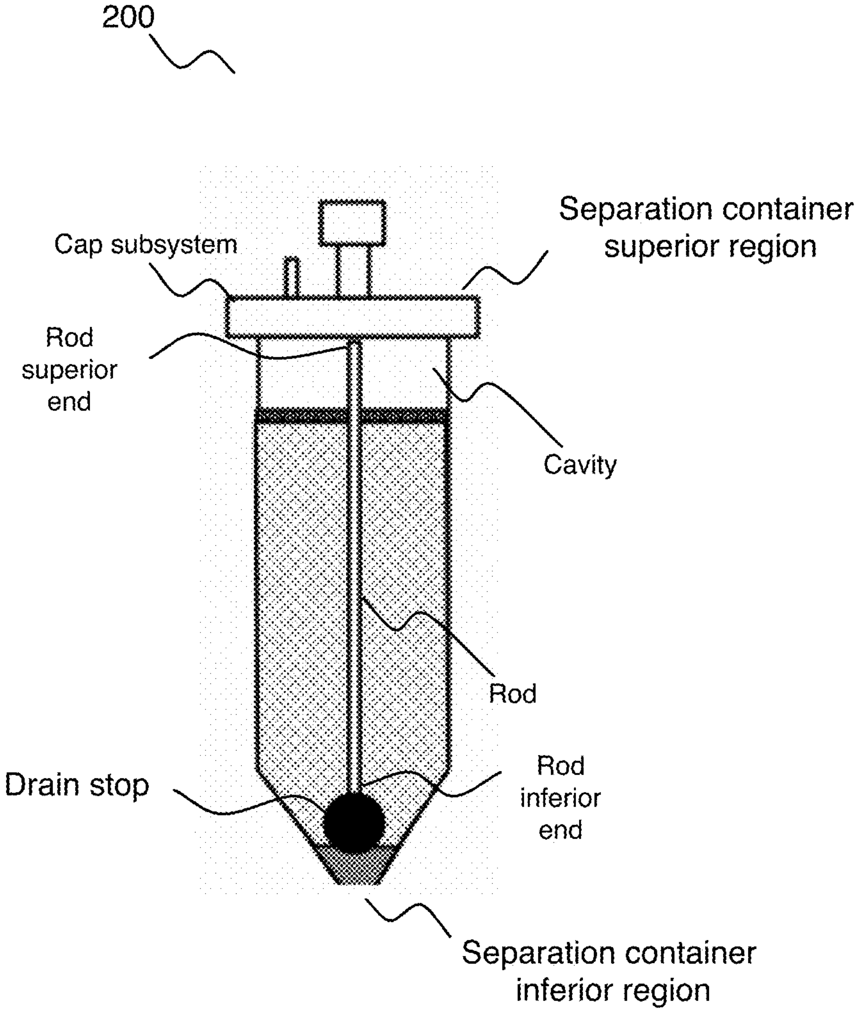
FIG. 21 depicts a variation of a system for buoyant separation.

In a first variation of the system (e.g., as shown in FIGS. 15A-15B and 21), the system includes a separation container, the separation container including any or all of: a separation tube which defines a drainage hole at an inferior end of the separation tube; a cap subsystem including a cap and a cap insert; a shaft which is attached to the cap and passes through an internal cavity of the cap insert, wherein rotation of the cap relative to the cap insert causes rotation of the shaft; and a drain stop at an inferior end of the shaft, wherein rotation of the shaft in a particular direction causes lifting of the drain stop, which enables contents of the separation container to flow through the drainage hole. Additionally, the separation container can include: an agitation subsystem (e.g., fins coupled to the drain stop) that assists with drainage of the contents (e.g., breakage of a pellet to be drained); a centering mechanism (e.g., to keep the shaft aligned with a central axis of the tube); and/or any other components. In a cross-sectional view of a drain stop with an agitation mechanism as shown in FIG. 15B, for instance, an agitation mechanism can be implemented which includes a set of triangular fins to contact and/or scrape the walls of the separation container, along with a frustoconical-shaped (e.g., having a curved bottom) drain stop.

In a set of specific examples, the cap defines an internal feature (e.g., internal protrusion, internal notch, etc.) and the cap insert defines a curved feature (e.g., ramp) or other mechanism which the internal feature of the cap can move along during movement (e.g., rotation, translation, etc.) of the cap relative to the cap insert. In the examples shown in FIGS. 17A-17B, for instance, an inner protrusion feature defined in the cap follows along a ramp of the cap insert, where the alignment axis depicted in FIG. 17A corresponds to the axis of alignment of the cap over the cap insert, as well the axis along which a superior end of the shaft is inserted through the cap insert and the cap (e.g., wherein the shaft is secured to the cap). As shown in FIG. 17B, for a $1^{st}$ direction of rotation (shown as counter-clockwise rotation) of the cap relative to the cap insert, the inner protrusion of the cap hits the wall of the ramp feature (e.g., after a predetermined angle of rotation has been achieved), as depicted with the red arrows. As shown in FIG. 17B, for a $2^{nd}$ (e.g., opposing) direction of rotation (shown as clockwise rotation) of the cap relative to the cap insert, the inner protrusion of the cap goes up the ramp (along the green arrow) to a $1^{st}$ hard stop at which the drain is maximally open. If a user lets go of the cap, the inner protrusion slides down the ramp (opposing the green arrow) and closes the drain. Optionally, if the cap is lifted while going up the ramp and continuing clockwise rotation, the inner protrusion can travel over a stop that leads to a valley, which keeps the drain lifted (e.g., for use as a transport position for the separation containers such that there is not degradation before use/purchase), as shown with the yellow arrow.

Alternatively, the cap feature and the cap insert feature can be swapped (e.g., such that a protrusion of the cap insert moves along a ramp feature of the cap).

In a particular specific example (e.g., as shown in FIG. 17B), the interface between the cap and cap insert results in various configurations and/or states and/or functionalities for the separation container, such as: a loading configuration in which venting apertures of the cap and cap insert align, enabling materials to be loaded into (and/or removed from) a cavity of the separation container; an agitation configuration where, for a particular range of angles (e.g., 0 to 180 degrees, 0 to 200 degrees, 0 to between 160 and 270 degrees, 0 to between 180 and 220 degrees, etc.), the protrusion feature of the cap subsystem does not engage the ramp feature, thereby enabling agitation (e.g., wiping of the walls, scraping of the walls, breakage of a pellet, etc.) of the container contents with an agitation subsystem (e.g., 2 fins connected to drain stop which collectively rotate the full tube in 180 degrees); a draining configuration once the ramp is hit by the protrusion feature, where increased flow occurs as the protrusion travels up the ramp; a locked closed configuration when rotating in an opposing direction to the draining configuration; a locked open configuration when rotating in the same direction as draining but going past the ramp (e.g., into a valley through lifting of the cap); and/or any other configurations.

In a second variation of the system, the system can include any or all of the components of the first variation, where the cap moves the shaft through translation rather than rotation.

In a third variation of the system, the separation container interfaces with a collection container (e.g., removably coupleable collection container) which can collect materials from the drainage hole during drainage. The collection container can optionally enable separation to happen during a centrifugation process, such that in addition to or alternative to use of an agitation mechanism to release materials from the tube wall, the separation process force (e.g., centrifugal force) can be used to move cells into the collection chamber. These contents are then isolated from other materials when the collection chamber is removed. In an example (e.g., as shown in FIGS. 19A-19E), a venting aperture of the cap operates independently of the drainage subsystem, where rotation of the cap insert causes drainage and rotation of the cap causes access to the venting aperture (e.g., for venting, loading of materials, etc.). In this, the vent is preferably not automatically opened when the drainage hole is opened, but additionally or alternatively can be. Additionally or alternatively, any or all of the variations described above can have this functionality and/or cap subsystem configuration.

Additionally or alternatively, any or all of the variations can optionally interface with an automated instrument which functions to automatically perform any or all of the processes associated with usage of the separation container and/or the method 400.

4. Method

As shown in FIG. 2, the method 400 can include any or all of: receiving a set of separation containers; removing and/or adding materials to separation containers; mixing (e.g., end-over-end mixing, inversion mixing, etc.) the contents of the separation containers, which functions to enable and/or maximize binding of the buoyant particles with their specified binding materials (e.g., increase contact between materials of the separation container) and/or enable contents of the separation container to be more homogeneous; separating contents (e.g., through centrifugation, after mixing, etc.) of contents of the separation container, which can function to separate contents of the separation container (e.g., get buoyant particles to the top of the separation container contents); and/or processing the materials of the separation containers. Additionally or alternatively, the method 400 can include performing any of the processes described above and/or any other processes.

The method can be any or all of: manually performed; automatically performed (e.g., with an automated instrument 300 as described above); partially automatically performed; and/or any combination.

The method can be used to perform separation in any or all of: cell isolation use cases, nucleic acid extraction, immunoprecipitation, and/or any other use cases.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A system for a selective containment of a set of materials in a container, the system comprising:
- the container defining a cavity;
- a drainage hole defined at an inferior region of the container;
- a drain stop configurable in a set of operation modes;
- a cap removably couplable with a superior region of the container;
- a cap insert, the cap insert configured for rotation relative to the cap; and
- a venting subsystem comprising:
  - a first venting aperture defined at a surface of the cap insert;
  - a second venting aperture defined at a surface of the cap, wherein rotation of the cap relative to the cap insert in a first direction produces:
    - a switch between operation modes of the set of operation modes of the drain stop;
    - misalignment of the second venting aperture relative to the first aperture; and
    - a height gap between the cap and the cap insert, wherein the height gap establishes an air path between the misaligned first and second venting apertures, wherein the container is vented via the air path.

2. The system of claim 1, wherein the switch between operation modes comprises switching from a closed configuration mode to an open configuration mode, wherein:
- in the closed configuration mode, the drain stop prevents passage of materials in the cavity through the drainage hole; and
- in the open configuration mode, the drain stop allows passage of materials in the cavity through the drainage hole.

3. The system of claim 1, wherein at least one of the cap or the cap insert defines a sloped feature, wherein rotation of the cap relative to the cap insert is along the sloped feature.

4. The system of claim 3, wherein the sloped feature is a ramp.

5. The system of claim 3, wherein the cap insert defines the sloped feature, wherein rotation of the cap relative to the cap insert in the first direction comprises movement of the cap up the sloped feature.

6. The system of claim 1, wherein the system is configured for use in a separation of a subset of non-target materials in the set of materials from a subset of target materials in the set of materials, wherein each of the subset of target materials is bound to a buoyant particle, and wherein the switch between operation modes comprises enabling passage of the subset of non-target materials through the drainage hole.

7. The system of claim 1, wherein the set of operation modes of the drain stop comprises a set of heights of the drain stop relative to the drainage hole.

8. The system of claim 7, wherein movement of the cap relative to the cap insert in a second direction, the second direction opposing the first direction, decreases a height of the gap.

9. The system of claim 1, wherein during rotation of the cap relative to the cap insert in the first direction, the first venting aperture is misaligned relative to the second venting aperture.

10. The system of claim 1, wherein the height gap between the cap and the cap insert comprises a height gap between the surface of the cap and the surface of the cap insert.

11. A system for a selective containment of a set of materials in a container, the system comprising:
- the container defining a cavity;
- a drainage hole defined at an inferior region of the container;
- a drain stop configurable in a set of operation modes;
- a cap removably couplable with a superior region of the container;
- a rod connected to the drain stop at a first end, and connected to the cap at a second end; and
- a cap insert, wherein the rod passes through the cap insert, the cap insert configured for rotation relative to the cap, wherein:
  - at least one of the cap or the cap insert defines a sloped feature;
  - rotation of the cap relative to the cap insert in a first direction produces movement along the sloped feature; and
  - movement along the sloped feature lifts the cap, the rod, and the drain stop relative to the cap insert, producing an increase in height of the drain stop relative to the drainage hole, the increase in height corresponding to a draining operation mode of the drain stop.

12. The system of claim 11, wherein the set of operation modes of the drain stop are associated with differences in height of the drain stop relative to the drainage hole.

13. The system of claim 11, wherein the drain stop defines a set of fins, the set of fins configured to wipe an interior surface of the separation container during movement of the cap relative to the cap insert.

14. The system of claim 13, wherein the system is configured for use in a separation of a subset of non-target materials in the set of materials from a subset of target materials in the set of materials, wherein each of the subset of target materials is bound to a buoyant particle, and wherein the switch between operation modes comprises enabling passage of the subset of non-target materials through the drainage hole.

15. The system of claim 14, wherein the wiping of the interior surface of the separation container is configured to enable drainage of the subset of non-target materials.

16. The system of claim 11, wherein the cap insert defines the sloped feature, wherein rotation of the cap relative to the cap insert in the first direction comprises movement of the cap up the sloped feature.

17. The system of claim 16, wherein the sloped feature is a ramp.

18. The system of claim 17, wherein the cap defines a protrusion feature at an interior surface of the cap, wherein the protrusion feature moves along the ramp.

19. The system of claim 17, wherein a height of the ramp is configured to effect a predetermined range of initial drainage flow rates through the drainage hole during an open configuration mode of the set of operation modes.

20. The system of claim 11, wherein the rod comprises a protrusion, wherein the protrusion limits the increase in height.

* * * * *